(12) United States Patent
Tsui et al.

(10) Patent No.: US 10,183,222 B2
(45) Date of Patent: Jan. 22, 2019

(54) SYSTEMS AND METHODS FOR TRIGGERING ACTION CHARACTER COVER IN A VIDEO GAME

(71) Applicant: Glu Mobile, Inc., San Francisco, CA (US)

(72) Inventors: Wai Shek Tsui, San Bruno, CA (US); Ankur Anand, Patna (IN)

(73) Assignee: Glu Mobile Inc., San Francisco, CA (US)

( * ) Notice: Subject to any disclaimer, the term of this patent is extended or adjusted under 35 U.S.C. 154(b) by 180 days.

(21) Appl. No.: 15/089,219

(22) Filed: Apr. 1, 2016

(65) Prior Publication Data

US 2017/0282076 A1   Oct. 5, 2017

(51) Int. Cl.
| | |
|---|---|
| A63F 13/00 | (2014.01) |
| A63F 13/56 | (2014.01) |
| A63F 13/35 | (2014.01) |
| A63F 13/537 | (2014.01) |
| A63F 13/837 | (2014.01) |
| A63F 13/2145 | (2014.01) |

(52) U.S. Cl.
CPC .......... *A63F 13/56* (2014.09); *A63F 13/2145* (2014.09); *A63F 13/35* (2014.09); *A63F 13/537* (2014.09); *A63F 13/837* (2014.09)

(58) Field of Classification Search
CPC ........ A63F 13/56; A63F 13/35; A63F 13/537; A63F 13/837
USPC .......................................................... 463/31
See application file for complete search history.

(56) References Cited

U.S. PATENT DOCUMENTS

| | | | |
|---|---|---|---|
| 6,379,429 B1* | 4/2002 | Scranton, Jr. ...... | B01D 53/0415 95/143 |
| 6,634,948 B1* | 10/2003 | Hayashi ................. | A63F 13/12 463/40 |
| 2005/0026684 A1* | 2/2005 | Sumi ...................... | A63F 13/04 463/31 |

(Continued)

OTHER PUBLICATIONS

Aker, Çakir, "Methodological Review of Playability Heuristics", Proc. Eurasia Graphics, Istanbul, Turkey, Nov. 405, 2017.

(Continued)

*Primary Examiner* — Jay Liddle
*Assistant Examiner* — Ryan Hsu
(74) *Attorney, Agent, or Firm* — Morgan, Lewis & Bockius LLP

(57) ABSTRACT

Systems and methods are provided in which a character possessing a weapon is displayed in a scene along with first and second affordances. Responsive to first affordance user contact, scene orientation is changed. Responsive to second affordance user contact with a first status of the weapon, a firing process is performed in which the weapon is fired and the weapon status is updated. When (i) the first and second affordances are user contact free or (ii) the second affordance is presently in user contact and there is a second weapon status, firing is terminated. Alternatively, when the second affordance is presently in user contact and there is a first weapon status, the firing is repeated. Alternatively still, with (i) present first affordance user contact, (ii) a first weapon status, and (iii) no present second affordance user contact, the firing is repeated upon second affordance user contact.

19 Claims, 15 Drawing Sheets

(56) References Cited

U.S. PATENT DOCUMENTS

2010/0009734 A1* 1/2010 Sambongi ............... A63F 13/10 463/5

OTHER PUBLICATIONS

Android Gamespot, "Top 6 Rail Shooter Games on Android—iOS 2018 (FPS),", Youtube. https://www.youtube.com/watch?v=LNJ_YUs55us, published Jan. 14, 2018.
App Annie, https://www.appannie.com/apps/google-play/app/com.glu.t5/app-ranking/?type=best-ranks&date=2018-06-19.
Bell, Killian, "Why You Can't Play Fortnite Mobile with a Game Controller", https://www.cultofmac.com/author/killian-bell/, 7:15 AM, Apr. 13, 2018.
Dredge, Stuart, "20 Best New Android Apps and Games This Week", Technology, The Guardian, https://www.theguardian.com/technology/2015/jun/16/best-android-apps-games-photoshop-tiki-taka-soccer, accessed Jun. 20, 2018.
Fabricatore, Carlo, "Gameplay and Game Mechanics Design: A Key to Quality in Videogames", Gameplay and Game Mechanics Design, OECD Expert Meeting on Videogames and Education, print, 2018.
Google Play Store, https://play.google.com/store/apps/details?id=com.glu.t5, accessed Jun. 2018.
Lee, Byungjoo et al., "Modelling Error Rates in Temporal Pointing", CHI '16, p. 1857, May 2016.
Tassi, Paul, "Fortnite: Battle Royale' Mobile iOS Controls: Better than Expected, and Better than Nothing", Forbes, https://www.forbes.com/sites/insertcoin.2018/03/16/fortnite-battle-royale-mobile-ios-controls-better-than-expected-and-better-than-nothing/#5524bb162d4a, Mar. 15, 2018.
Wong, Steven, "Mobile First-Person Shooters aren't Servicing the Market", https://www.alistdaily.com/author/steven-2/, May 25, 2017, 12:20 PM.

* cited by examiner

| Row | Virtual Character 602 Status Is "Cover" | Targets Remaining | Weapon 604 In First Value Range | First Affordance 608 Engaged By User | Second Affordance 702 Engaged By User | Action |
|---|---|---|---|---|---|---|
| 1 | * | No | * | * | * | Advance virtual character 602 to new position in scene 606, terminate level/campaign, or advance to new scene 606 |
| 2 | * | Yes | No | Any | Any | Change virtual character 602 status to "cover" until the weapon 604 is in first value range |
| 3 | Yes | Yes | Yes | Yes | No | Adjust scene 606 in accordance with first affordance interaction 608 with user |
| 4 | Yes | Yes | Yes | Any | Yes | Change/Maintain virtual character 602 status to/as "active" and fire weapon 604 |
| 5 | No | Yes | Yes | Yes | No | Adjust scene 606 in accordance with first affordance 608 interaction with user and maintain virtual character 602 status as "active", but do not fire weapon 604 |
| 6 | No | Yes | Yes | No | Yes | Maintain virtual character 606 status as "active" with weapon 604 firing |
| 7 | No | Yes | Yes | Yes | Yes | Adjust scene 606 in accordance with first affordance 608 interaction with user, keep virtual character 602 status as "active", and fire weapon 604 |
| 8 | No | Yes | Yes | No | No | Change/maintain virtual character 602 status to/as "cover" |

FIG. 12

SYSTEMS AND METHODS FOR TRIGGERING ACTION CHARACTER COVER IN A VIDEO GAME

TECHNICAL FIELD

The disclosed implementations relate generally to improved shooter controls for taking virtual characters in and out of cover in action video games involving targets with adversity.

BACKGROUND

With reference to FIG. 10, in standard cover shooter controls, a player has three main inputs/touch regions for getting in/out of cover and shooting. First, there is a view touch region 1002 to adjust the camera view (pitch and/or yaw) of the action scene 1001. Typically, as illustrated in FIG. 10, this view touch region is not visible to the user. Second, there is a fire button 1004. If the virtual character 1006 is in a covered state as illustrated in FIG. 10, pressing the fire button 1004 causes the virtual character 1006 to come out of the covered state into a weapon readied state, as illustrated in FIG. 11, and to fire. If the virtual character 1006 is in the weapon readied state, as illustrated in FIG. 11, pressing the fire button 1004 causes the virtual character 1006 to fire their weapon. Third, there is a cover button 1008. If the virtual character 1008 is in the covered state, for instance, as illustrated in FIG. 10, pressing the cover button 1008 either does nothing or gets the virtual character out of the covered state and into the weapon readied state, depending on the game implementation. If the virtual character 1008 is in the weapon readied state, as illustrated in FIG. 11, pressing the cover button 1008 gets the virtual character 1008 into the covered state, as illustrated in FIG. 10. Thus, the cover button 1006 is used to toggle the virtual character 1006 into and out of the covered state.

The covered state is useful for weapon reloading and to prevent getting damaged from adverse characters. The weapon readies state is useful for immediately firing a weapon at enemy characters, upon pressing of the fire button. However, the extra layer of input imposed by the cover button illustrated, for example, in FIGS. 10 and 11, can be unsatisfactory for video game players. Players are required to at all times remember the virtual character state (covered state or weapon readied state), particularly when it is time to reload a weapon or to wait for new adverse characters to appear in a scene. Thus, when the user has completed firing, they must remember to press the cover button 1004 to return to the covered stated. Further, in some game implementations, before they can start firing, if they are in the covered state, they must first press the cover button 1008 to get their virtual character out of the covered state and into the weapon readied state before they can start firing. Often players forget about the cover button when their virtual character is in the exposed weapon readied stated, leading their virtual character to be needlessly exposed to potential attach by adverse characters. Further, in some games where the fire button is not sufficient to get users out of the covered state, players forget about the cover button when their virtual character is in the covered stated, leading to delay in getting their virtual character to be in the weapon readied state and firing their weapon.

Moreover, the cover button is further disadvantageous because it can be overwhelming for new players, especially when there is a multitude of other buttons on the screen. For instance, in the typical prior art game illustrated in FIGS. 10 and 11, there is a scope button 1010. When the user toggles on the scope 1010, a close up view of the base defendants is provided. As another example, in the prior art game illustrated in FIGS. 10 and 11, there is a special items selection button 1012. When the user presses the special items selection button 1012, as illustrated in FIG. 11, the user is able to select special items (e.g., daggers, grenades, etc.) for use in the game. As still another example, in the prior art game illustrated in FIGS. 10 and 11, there is a pause button 1014. When the user presses the pause button 1014, the user is able to pause the game. In still other games, there are buttons for selecting a new weapon from the user's profile, button for weapon reloading, and/or buttons for character heal, to name a few non-limiting examples.

Given the above background, what is needed in the art is a new genre of video games that provide improved release controls for getting virtual characters to fire weapons and to take cover.

SUMMARY

The present disclosure addresses the above-identified need in the art by providing simplified release controls that offer a simpler, more natural control scheme for shooter control by removing a layer of complexity found in the prior art and discussed above. The release controls of the present disclosure provide a more natural, simpler method of user interaction that is particularly advantageous for touch screen cover shooters by removing the cover button. Using the disclosed user controls, in order for the virtual character to achieve the weapon readied state from the covered state, the user simply presses a fire button, and to get their virtual character back into the covered state, the user simply releases their fingers the screen (or at least the regions of the screen that encompass the view touch region and the fire region). Such release causes the virtual character to get back into the covered state, which is the natural default state for the virtual character.

The disclosed release mimics what the player in fact would want to do if no longer using view touch region or the fire button. If the user is using the view touch region when in the weapon ready state, it is likely that they want their virtual character to remain in the weapon readied state so that they can rapidly shoot at targets. And if the user is firing their weapons (by touching the fire region) they are required to be in the weapon readied state. But when the user is not aiming (with the view touch region) and the user is not firing, then advantageously, automatically and without any additional user interaction, the disclosed user controls cause the virtual character to move to the covered state. The user does not have to remember to press or touch a cover button.

The disclosed user controls provide a view touch region. In typical embodiments this view touch region is on the left side of the screen. When the user touches and drags on this view region, the camera view (pitch and/or yaw) of the displayed scene is adjusted. In typical embodiments, this touch region is not visible to the user. The disclosed user controls further provide a fire button. In some embodiments, the fire button is on the bottom right of the screen. If the virtual character is in the covered state, pressing the fire button causes the virtual character to come out of cover into the weapon readied state. If the virtual character is in the weapon readied state, touch and drag operations on view region cause the camera view to adjust while the virtual character's weapon is readied. If the virtual character is in the covered state, holding or tapping the fire button causes the virtual character to shoot its readied weapon. When there is no touch input on the touch region and the fire button, the virtual character will automatically return to the covered state.

In typical embodiments, when a player has their virtual character in the weapon readied state, the user will be holding their thumb on the touch view region to aim. Simply releasing the thumb from the viewport will naturally cause the virtual character to return to the covered state if the user is not pressing the shooting button. When the virtual character runs out of ammunition, the virtual character will automatically return to the covered state and reload the weapon as is the convention.

With that overview, in more detail, the present disclosure provides systems and methods for hosting a video game in which a virtual character possessing a weapon is displayed in a scene along with first and second affordances. Examples of affordances include, but are not limited to, slide bars, input field, radio buttons, contact buttons, and contact regions on a touch screen display. For instance, in some embodiments the first affordance is a contact region and the second affordance is a contact button. Responsive to first affordance user contact (e.g., the user dragging a finger across the first affordance), scene orientation (e.g., pitch and/or yaw) is changed. This is useful for aiming a weapon (which is typically fixed) into the scene. Responsive to second affordance user contact (e.g., pressing the second affordance) while the weapon has a first status (e.g., the weapon is loaded or partially loaded), a firing process is performed in which the weapon is fired and the weapon status is updated (e.g., if the weapon is a gun the number of bullets fired is subtracted from a weapon value, thereby affecting the weapon status). Advantageously, when either (i) the first and second affordances are user contact free or (ii) the second affordance is presently in user contact and there is a second weapon status (e.g., the weapon needs to be recharged, reloaded, etc.), firing is automatically terminated without any requirement that a "cover" button be contacted by the user.

Additionally, as follow up to the firing process and/or concurrently with the firing process, when the second affordance is presently in user contact (e.g., the user is pressing the second affordance) and there is a first weapon status (e.g., the weapon remains loaded or partially loaded), the firing process described above is repeated and/or seamlessly continued. Additionally still, as follow up to the firing process and/or concurrently with the firing process, when all the following three conditions are satisfied the firing process is paused but immediately repeated (or resumed) after second affordance user contact: (i) present first affordance user contact (e.g., the user is dragging their thumb across the first affordance), (ii) a first weapon status (e.g., the weapon is fully or partially loaded), and (iii) no present second affordance user contact (e.g., the user is not touching the second affordance).

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIG. 12 is a truth table for a set of user controls in accordance with an embodiment of the present disclosure.

Like reference numerals refer to corresponding parts throughout the several views of the drawings.

DETAILED DESCRIPTION

Figure 6:
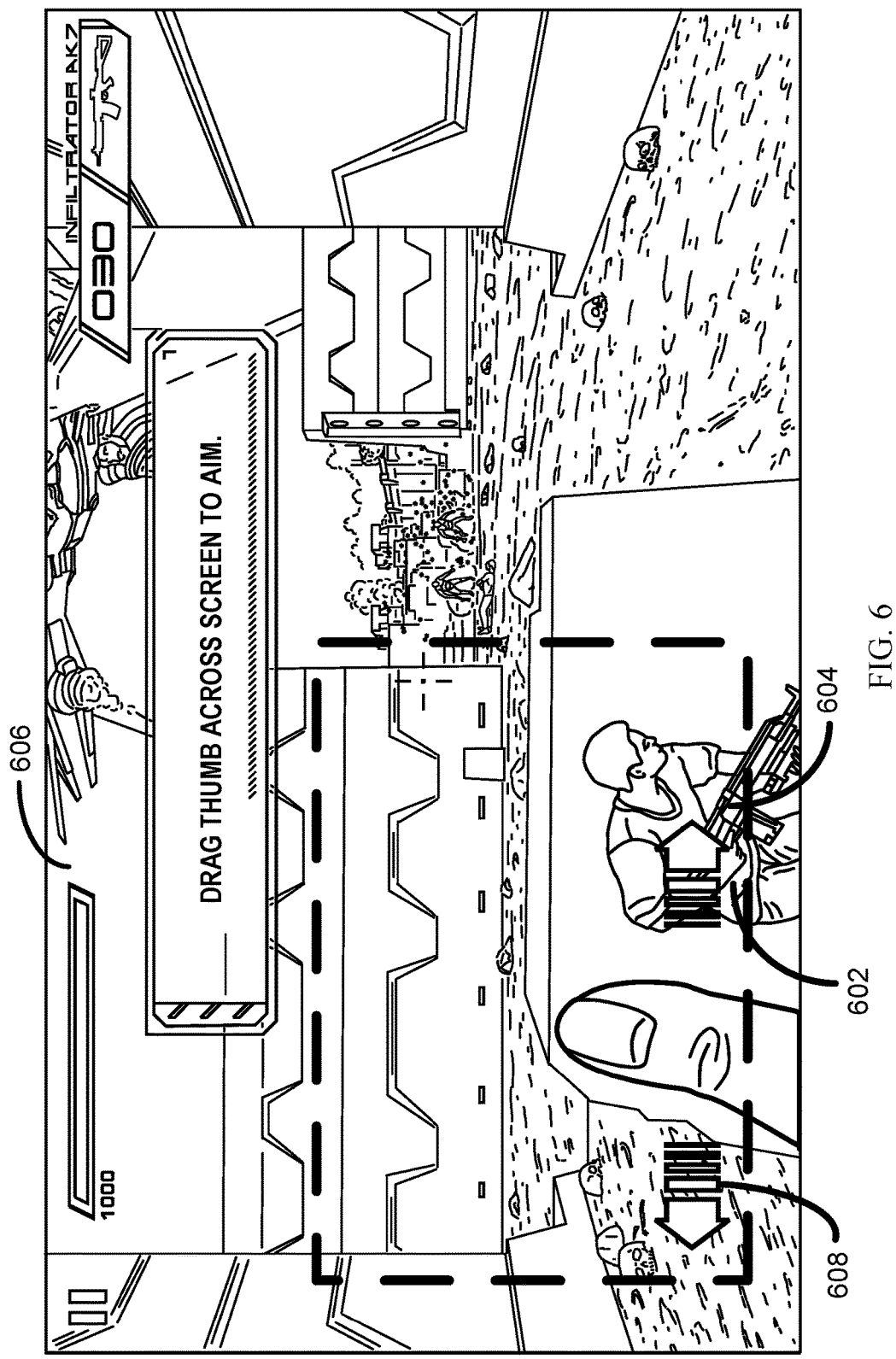
FIG. 6 is a screen image showing a virtual character with a cover status of "cover" displayed on a scene, and in which a user is dragging their thumb across a first affordance to change the orientation of the scene in accordance with an embodiment of the present disclosure.

With reference to FIG. 6, disclosed are systems and methods for hosting a video game in which a virtual character 602 possessing a weapon 604 is displayed in a scene 606 along with a first affordance 608. As is typically the case, in FIG. 6, this first affordance 608 is not visible to the user, and typically encompasses a specified region of the touch screen display illustrated in FIG. 6. Responsive to first affordance 608 user contact (e.g., the user dragging a finger across the first affordance 608 as illustrated in FIG. 6), scene 606 orientation (e.g., pitch and/or yaw) is changed. This is useful for aiming the weapon 604 into the scene 606.

Figure 8:
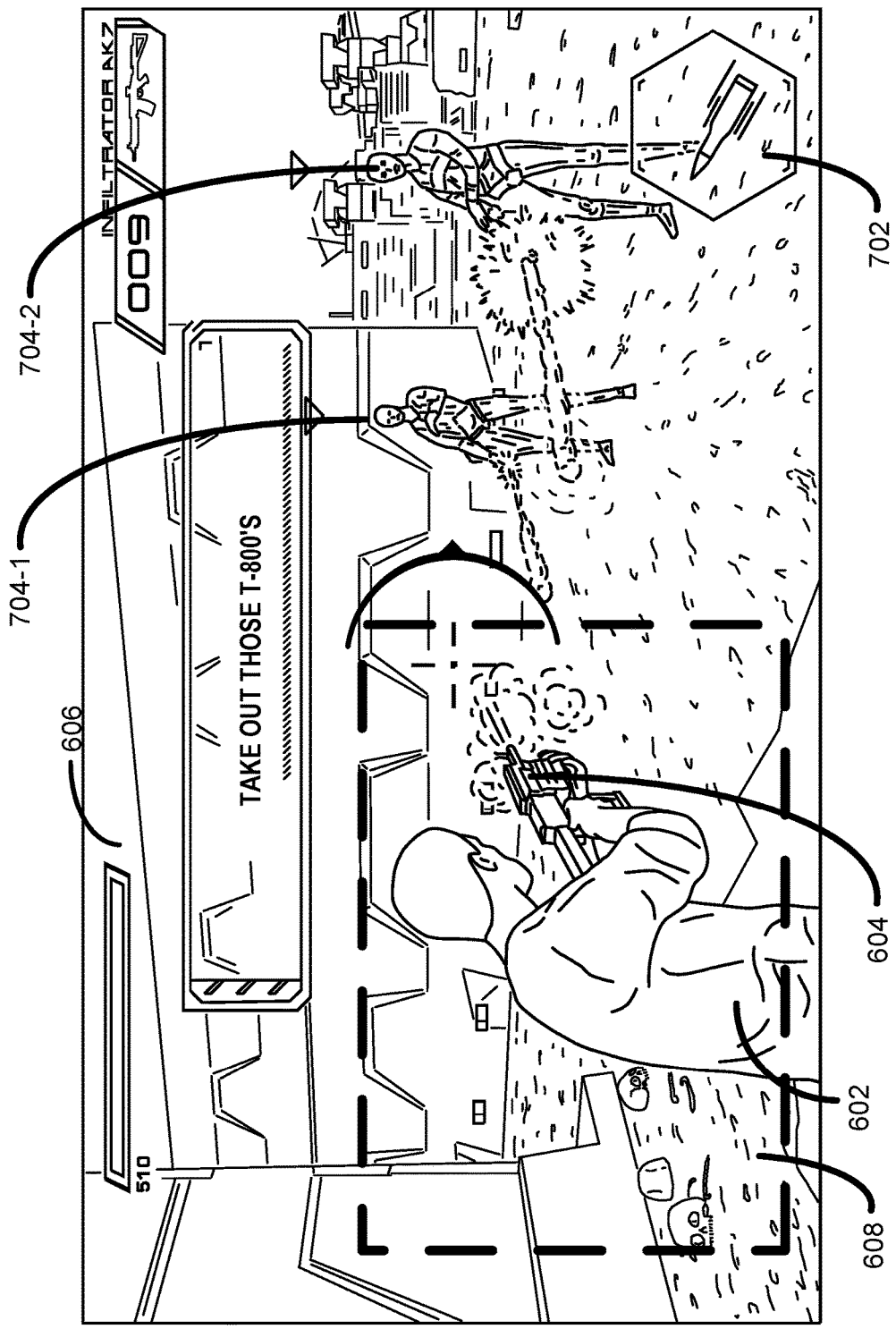
FIG. 8 is a screen image showing a firing process in which a virtual character with a cover status of "active" is displayed on a scene and in which the virtual character is firing their weapon at opponent characters in the scene in accordance with an embodiment of the present disclosure.

Referring to FIG. 8, responsive to second affordance user contact (e.g., pressing the second affordance 702) while the weapon has a first status (e.g., the weapon is loaded or partially loaded), a firing process is performed in which the weapon is fired and the weapon status is updated (e.g., if the weapon is a gun the number of bullets fired is subtracted from a weapon value, thereby affecting the weapon status, etc.). Advantageously, when either (i) the first 608 and second 702 affordances are user contact free or (ii) the second affordance 702 is presently in user contact and there is a second weapon status (e.g., the weapon needs to be recharged, reloaded, etc.), firing is automatically terminated without any requirement that the user interact with a "cover" button.

Figure 9:
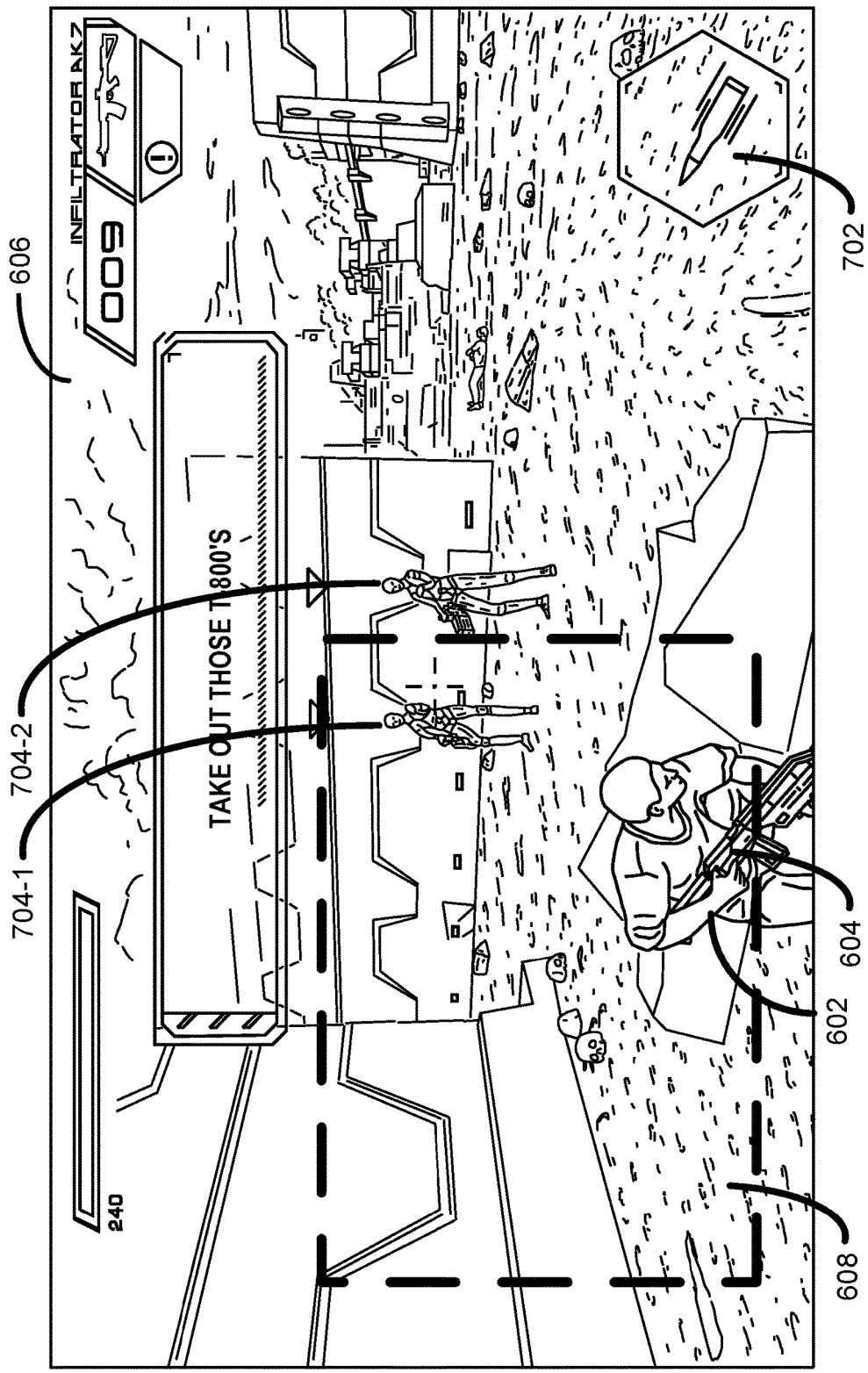
FIG. 9 is a screen image that follows sequentially from FIG. 8 when (i) the first and second affordances become user contact free or (ii) the second affordance is in user contact but the weapon status changes from a first weapon status (weapon loaded or partially loaded) to a second weapon status (e.g., the weapon needs to be recharged, reloaded, etc.) in accordance with an embodiment of the present disclosure.
Figure 10:
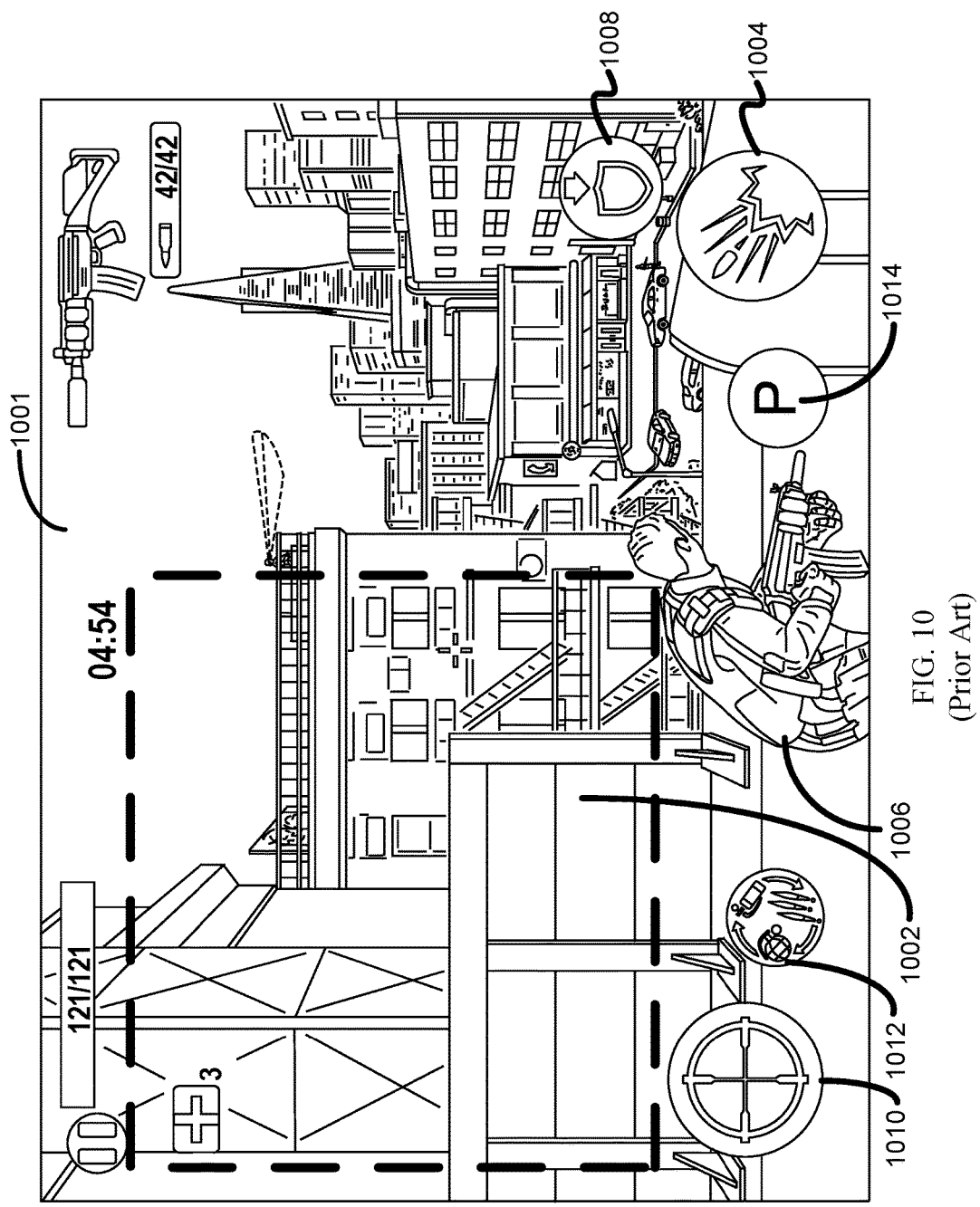
FIG. 10 is a screen image of a campaign in which a virtual character is in a cover position in accordance with the prior art.
Figure 11:
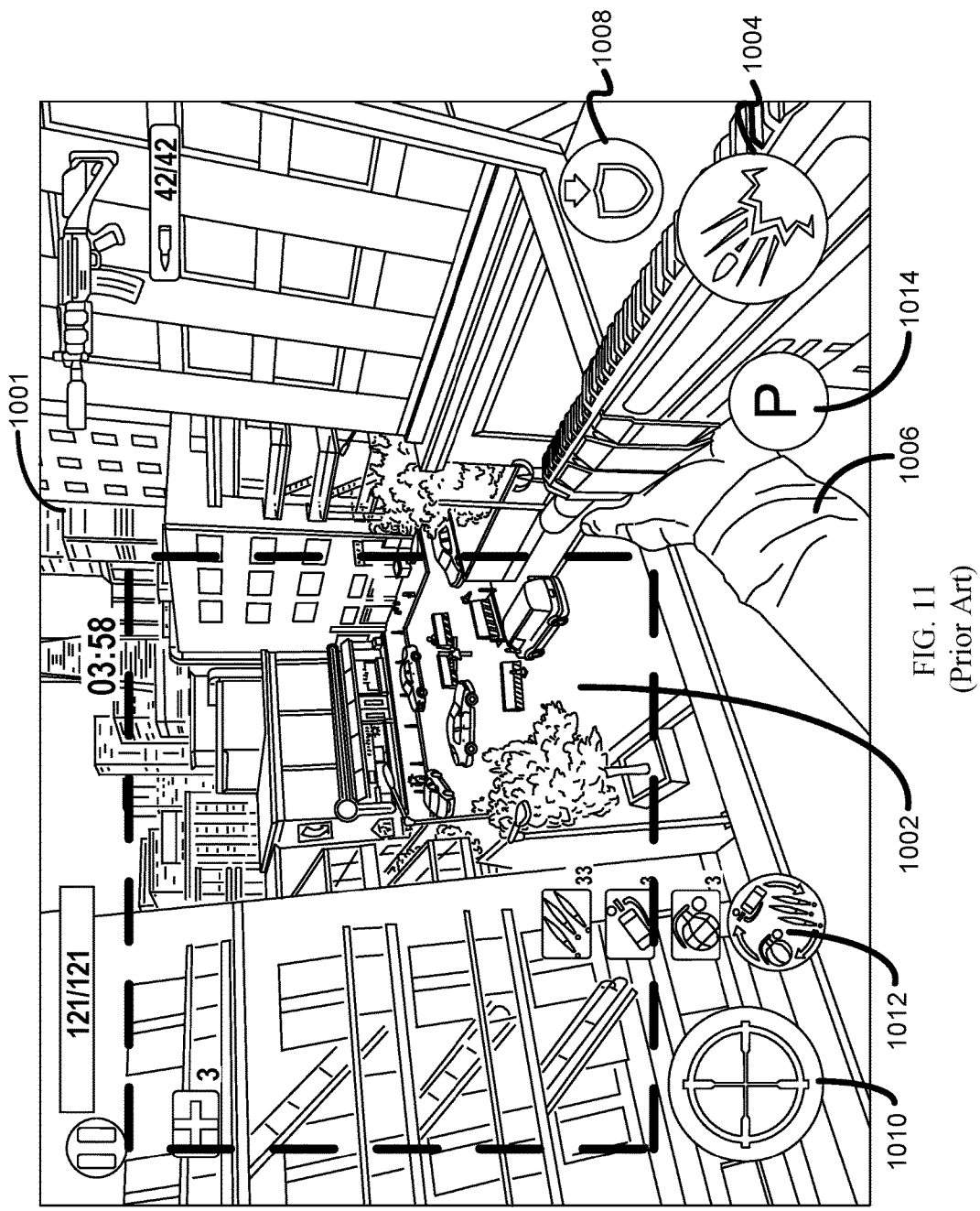
FIG. 11 is a screen image of a campaign in which a virtual character is in an active position and to return to the cover position must press a cover toggle button 1008 in accordance with the prior art.

In some embodiments, as follow up to the firing process and/or concurrently with the firing process, when the second affordance 702 is presently in user contact (e.g., the user is pressing the second affordance 702) and there is a first weapon status (e.g., the weapon 604 remains loaded or partially loaded), the firing process described above is repeated and/or seamlessly continued. Additionally still, as follow up to the firing process and/or concurrently with the firing process, when all the following three conditions are satisfied the firing process is paused but immediately repeated (or resumed) after second affordance user contact: (i) present first affordance 608 user contact (e.g., the user is dragging their thumb across the first affordance 608), (ii) a first weapon status (e.g., the weapon is fully or partially loaded), and (iii) no present second affordance 702 user contact (e.g., the user is not touching the second affordance). That is, the virtual character 602 maintains the active cover status but does not fire. Then, either user contact with the first affordance 608 subsides in which case the virtual character 602 assumes the cover status "cover" as illustrated in FIG. 9, or user contact with the second affordance 702 is made in which case the virtual character 602 assumes the cover status "active" and fires the weapon 604 as illustrated in FIG. 8.

Now that an overview of user controls in accordance to an embodiment has been described, a truth table for the user controls in a more complex embodiment is disclosed with reference to the table illustrated in FIG. 12.

Figure 7:
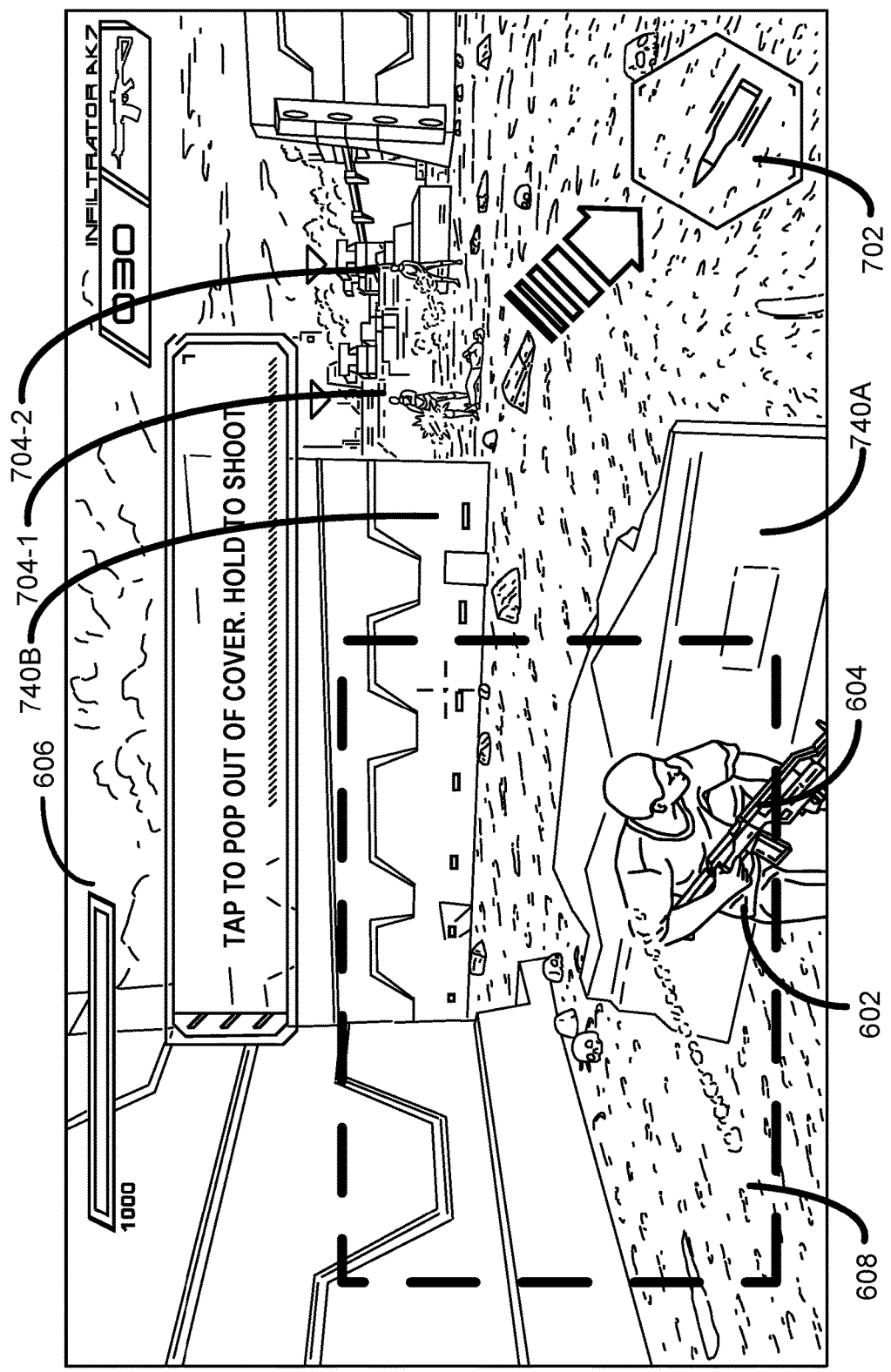
FIG. 7 is a screen image showing a virtual character with a cover status of "cover" displayed on a scene, and in which a user is invited to tap a second affordance to change the cover status of the virtual character to "active" and fire their weapon at opponent characters in the scene in accordance with an embodiment of the present disclosure.

With reference to row 1 of the table illustrated in FIG. 12, if no targets are remaining to shoot at, then the virtual character 602 is advanced to a new position within a scene 606, the present level/campaign that the virtual character 602 is in is terminated, or the virtual character is advance to a new scene 606. With reference to FIG. 7, examples of targets are opponents 704-1 and 704-2 in scene 606.

With reference to row 2 of the table illustrated in FIG. 12, if there are targets remaining to shoot at, the weapon 606 is in not in a first value range (e.g., the weapon is in need of reloading), the virtual character 602 status is involuntarily changed to "cover", thereby terminating weapon fire and forcing weapon reloading.

With reference to row 3 of the table illustrated in FIG. 12, if the virtual character 602 status is "cover" (as illustrated for instance in FIGS. 6, 7, and 9), there are targets remaining to shoot at, the weapon 604 is in a first value range (e.g., the weapon is loaded or at least partially loaded), the first affordance 608 is engaged by the user by the second affordance 702 is not engaged by the user, the scene 606 is adjusted in accordance with first affordance interaction with the user and the virtual character 602 status is not changed (e.g., it remains "cover").

With reference to row 4 of the table illustrated in FIG. 12, if the virtual character 602 status is "cover" (as illustrated for instance in FIGS. 6, 7, and 9), there are targets remaining to shoot at, the weapon 604 is in a first value range (e.g., the weapon is loaded or at least partially loaded), and the second affordance 702 is engaged by the user, the virtual character 602 status is either changed to, or maintained as, "active" and the weapon 604 is fired as illustrated in FIG. 8.

With reference to row 5 of the table illustrated in FIG. 12, if the virtual character 602 status is "active" (e.g., not "cover"), there are targets remaining to shoot at, the weapon 604 is in a first value range (e.g., the weapon is loaded or at least partially loaded), the first affordance is engaged by the user and the second affordance 702 is not engaged by the user, the scene 606 is adjusted in accordance with first affordance 608 interaction with the user and the virtual character 602 status is maintained as "active" and the weapon 604 is not fired.

With reference to row 6 of the table illustrated in FIG. 12, if the virtual character 602 status is "active" (e.g., not "cover"), there are targets remaining to shoot at, the weapon 604 is in a first value range (e.g., the weapon is loaded or at least partially loaded), the first affordance is not engaged by the user and the second affordance 702 is engaged by the user, the virtual character 602 status is maintained as "active" with the weapon 604 firing.

With reference to row 7 of the table illustrated in FIG. 12, if the virtual character 602 status is "active" (e.g., not "cover"), there are targets remaining to shoot at, the weapon 604 is in a first value range (e.g., the weapon is loaded or at least partially loaded), and both the first affordance 608 and second affordance 702 is engaged by the user, the scene 606 is adjusted in accordance with first affordance 608 interaction with the user while keeping the virtual character 602 status "active" with the weapon 604 firing.

With reference to row 8 of the table illustrated in FIG. 12, if the virtual character 602 status is "active" (e.g., not "cover"), there are targets remaining to shoot at, the weapon 604 is in a first value range (e.g., the weapon is loaded or at least partially loaded), and neither the first affordance 608 nor the second affordance 702 is engaged by the user, an automatic "cover" is enacted in which the virtual character 602 status is changed or maintained as "cover" with the weapon 604 not firing.

Figure 1:
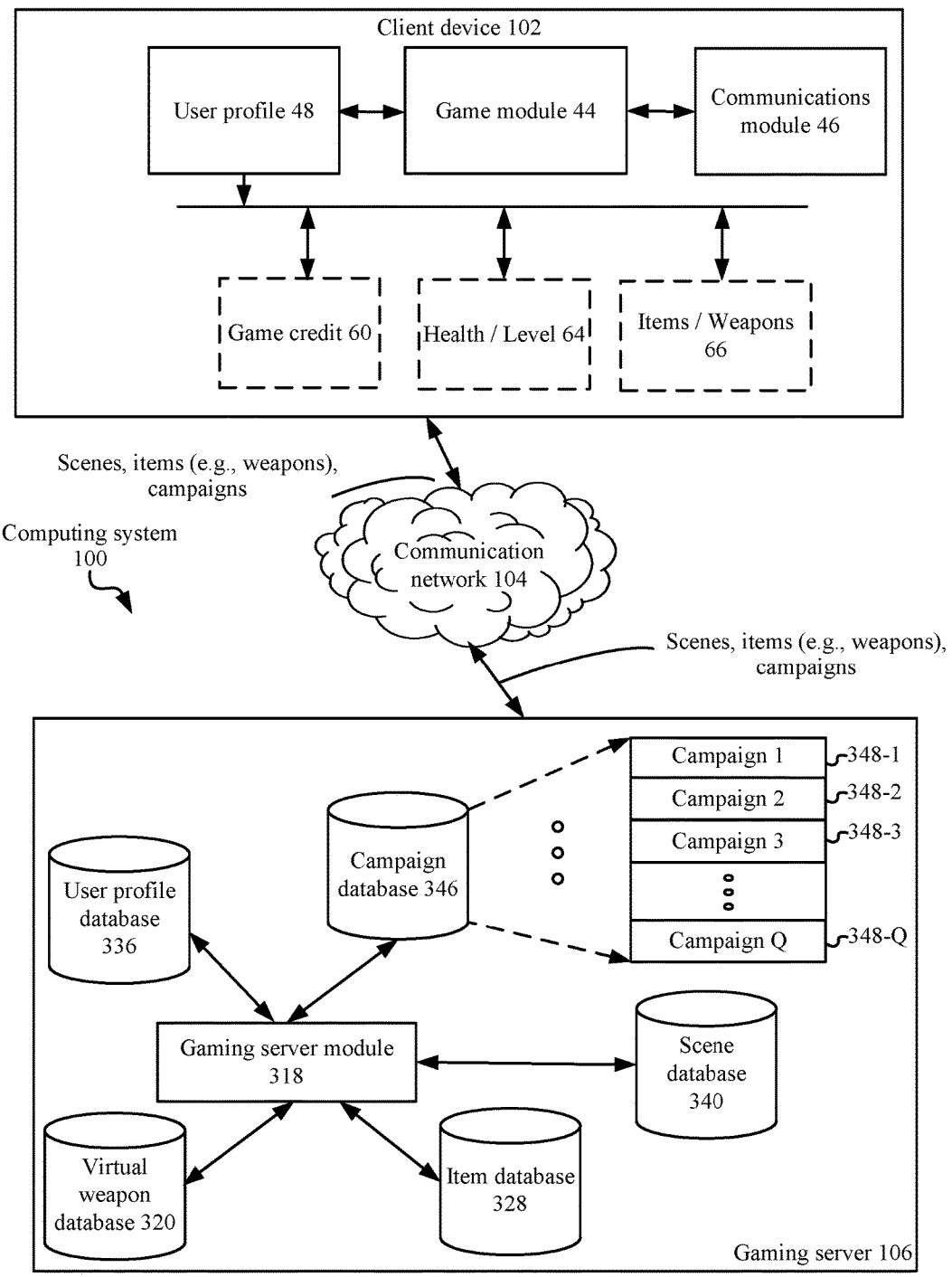
FIG. 1 is an example block diagram illustrating a computing system, in accordance with some implementations of the present disclosure.
Figure 2:
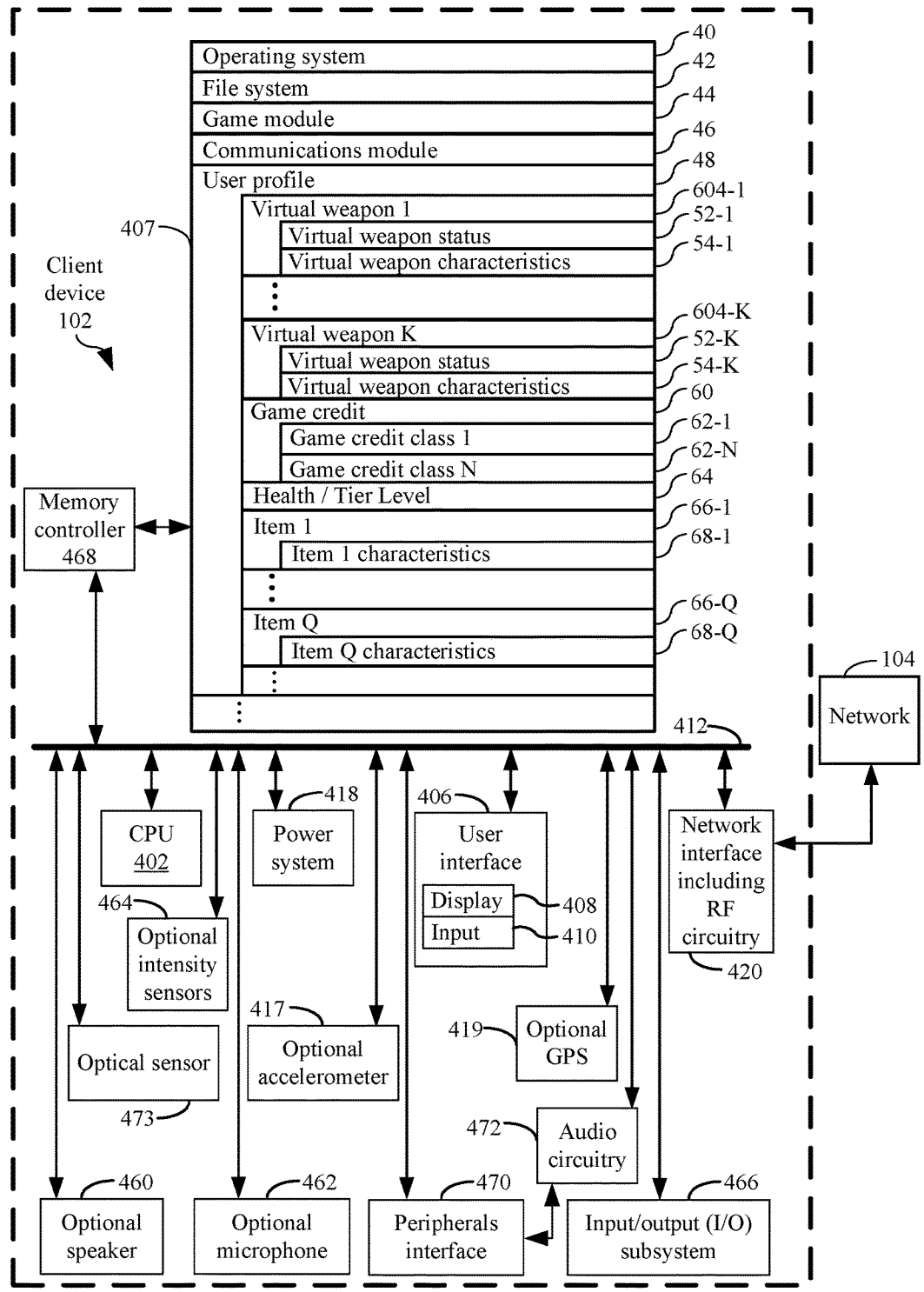
FIG. 2 is an example block diagram illustrating a client computing device, in accordance with some implementations of the present disclosure.
Figure 3:
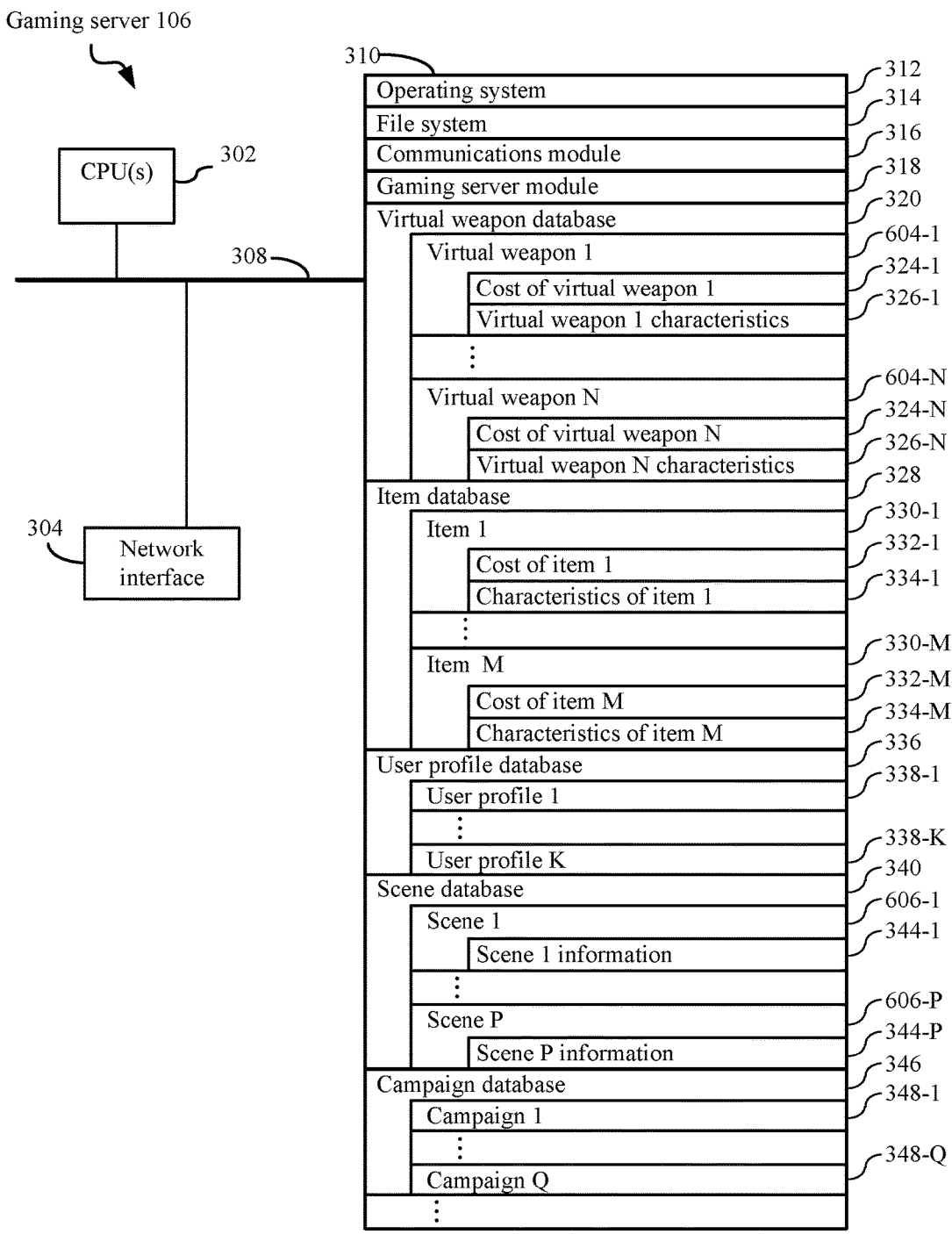
FIG. 3 is an example block diagram illustrating a gaming server, in accordance with some implementations of the present disclosure.

Additional details of systems, devices, and/or computers in accordance with the present disclosure are now described in relation to the FIGS. 1-3.

FIG. 1 is a block diagram illustrating a computing system 100, in accordance with some implementations. In some implementations, the computing system 100 includes one or more computing devices 102 (e.g., computing devices 102A, 102B, 102C, 102D . . . , and 102N), a communication network 104, and one or more gaming server systems 106. In some implementations, a computing device 102 is a phone (mobile or landline, smart phone or otherwise), a tablet, a computer (mobile or otherwise), or a hands free computing device. In some embodiments, a computing device 102 is any device having a touch screen display.

In some implementations, a computing device 102 provides a mechanism by which a user earns game credit through successful completion of one or more campaigns within a game. In these campaigns, a virtual character 602 is posed against multiple adverse characters (e.g., defendants of a base not associated with the user). For instance, in some embodiments the user must use their virtual character 602 to infiltrate a base (or other defensive or offensive scenes 606) associated with another user. The virtual character 602 infiltrates the opposing base (or other defensive or offensive scene 606) in a three dimensional action format in which their virtual character 602 and defendants (e.g., opponents 704 of FIG. 7) of the base or other form of scene 606 are adverse to each other and use weapons against each other. Advantageously, in some embodiments the virtual character 602 has an ability to fire a weapon 604 in three dimensions, and explore scenes 606 in three dimensions, during such campaigns. Advantageously, in other embodiments the virtual character 602 has an ability to swing a weapon (e.g., a sword or knife) in three dimensions, and explore the base in three dimensions, during such campaigns. In some embodiments, successful completion of campaigns leads to the award of game credit to the user. In some such embodiments, the user has the option to use such game credit to buy better items (e.g., weapons) or upgrade the characteristics of existing items. This allows the user to conduct campaigns of greater difficulty (e.g., neutralize scenes that have more opponents or opponents with greater health, damage, or other characteristics).

Referring to FIG. 1, in some implementations, the computing device 102 includes a game module 44 that facilitates the above identified actions. In some implementations, the computing device 102 also includes a user profile 48. The user profile 48 stores characteristics of the user such as game credit 60 that the user has acquired, the health of the user in a given campaign and the level 64 that the user has acquired through successful campaign completions, and the items (e.g., weapons, armor, etc.) 66 that the user has acquired. In some implementations, the computing device 102 also includes a communications module 46. The communications module 46 is used to communicate with gaming server 106, for instance, to acquire additional campaigns, look up available item upgrades, report game credit, identify available items and/or weapons or their characteristics, receive new campaigns and/or new events within such campaigns (e.g., special new adversaries, mystery boxes, or awards).

In some implementations, the communication network 104 interconnects one or more computing devices 102 with each other, and with the gaming server system 106. In some implementations, the communication network 104 optionally includes the Internet, one or more local area networks (LANs), one or more wide area networks (WANs), other types of networks, or a combination of such networks.

In some implementations, the gaming server system 106 includes a gaming server module 318, a user profile database 336, a campaign database 346 comprising a plurality of campaigns 348, a scene database 340, an item database 328, and/or a virtual weapon database 320. In some embodiments, the virtual weapon database 320 is subsumed by item database 328. In some embodiments, the gaming server module 318, through the game module 44, provides players (users) with campaigns 348. Typically, a campaign 348 challenges a user to infiltrate and/or compromise one or more scenes 606 such as the scene illustrated in FIG. 6. Advantageously, in some embodiments, the gaming server module 318 can draw from any of the scenes 606 in scene database 340 to build campaigns 348. In alternative embodiments, the gaming server module 318 draws from upon a predetermined set of scenes 606 in scene database 340 to build one or more predetermined campaigns 348.

In some embodiments, as each player progresses in the game, they improve their scores or other characteristics. In some embodiments, such scores or other characteristics are used to select which scenes 606 and/or opponents 704 are used in the campaigns offered by gaming server module 318 to any given player. The goal is to match the skill level and/or experience level of a given player to the campaigns the user participates in so that the given player is appropriately challenged and is motivated to continue game play. Thus, in some embodiments, the difficulty of the campaigns offered to a given user matches the skill level and/or experience level of the user. As the user successfully completes campaigns, their skill level and/or experience level advances. In some embodiments, gaming server module 318 allows the user to select campaigns 348.

In some embodiments, the campaign database 346 is used to store the campaigns 348 that may be offered by the gaming server module 318. In some embodiments, some or all of the campaigns 348 in the campaign database 346 are system created rather than user created. This provides a measure of quality control, by ensuring a good spectrum of campaigns of varying degrees of difficulty. In this way, there are campaigns 348 available for both beginners and more advanced users. In some embodiments, a campaign 348 is a series of scenes and thus in some embodiments scene database 340 is subsumed by campaign database 346 and/or campaign database 346 accesses scenes 606 from scene database 340.

As referenced above, in some embodiments, the scene database 340 stores a description of each of the scenes 606 that may be used in campaigns offered by the gaming server module 318 and/or game module 44. In some embodiments each campaign has, at a minimum, a target. The target represents the aspect of the campaign that must be compromised in order to win the campaign. In some embodiments, the target is the location of a special henchman that is uniquely associated with the campaign. The henchman is the lead character of the campaign. In some embodiments, killing the henchman is required to win a campaign. In some embodiments, each scene 606 is three-dimensional in that the user can adjust the pitch and yaw of the scene in order to aim a weapon into the scene. In some embodiments, each scene 606 is three-dimensional in that the user can adjust the pitch, yaw and roll of the scene in order to aim a weapon into the scene. As such, a three-dimensional scene 606 can be manipulated in three dimensions by users as their virtual characters 602 traverse through the scene. More specifically, in some embodiments, the virtual character 602 is given sufficient viewing controls to view the three-dimensional scene in three dimensions. For example, in some embodiments, the three dimensions are depth, left-right, and up-down. In some embodiments, the three dimensions are controlled by pitch and yaw. In some embodiments, the three dimensions are controlled by pitch, yaw and roll. Examples of the possible three-dimensional scenes 606 include, but are not limited to, a parking lot, a vehicle garage, a warehouse space, a laboratory, an armory, a passageway, an office, and/or a missile silo. In typical embodiments, a campaign stored in campaign database 346 has more than one three-dimensional scene 606, and each of the three-dimensional scenes 606 of a campaign 348 are interconnected in the sense that one the user neutralizes the opponents in one scene 606 they are advanced to another scene in the campaign. In some embodiments, such advancement occurs through a passageway (e.g., doorway, elevator, window, tunnel, pathway, walkway, etc.). In some embodiments, such advancement occurs instantly in that the user's virtual character 602 is abruptly moved to a second scene in a campaign when the user has neutralized the opponents in the first scene of the campaign.

In some embodiments, each game user is provided with one or more items (e.g., weapons, armor, food, potions, etc.) to use in the campaigns 348. In some embodiments, a user may purchase item upgrades or new items altogether. In some embodiments, a user may not purchase item upgrades or new items altogether but may acquire such upgrades and new items by earning game credit through the successful completion of one or more of the campaigns 348. In some embodiments, a user may not purchase item upgrades or new items altogether but may acquire such upgrades and new items by earning game credit through both successful and unsuccessful completion of one or more of the campaigns 348.

In some embodiments, the gaming server module 318 provides users with an interface for acquiring items (e.g. weapon) upgrades or new items. In some embodiments, the gaming server module 318 uses the item database 328 to track which items and which item upgrades (item characteristics) are supported by the game. In some embodiments, the items database 328 provides categories of items and the user first selects an item category and then an item in the selected item category. In the case where the items include virtual weapons, exemplary virtual weapons categories include, but are not limited to assault rifles, sniper rifles, shotguns, Tesla rifles, grenades, and knife-packs.

In some embodiments, users of the video game are ranked into tiers. In one example, tier 1 is a beginner level whereas tier 10 represents the most advanced level. Users begin at an initial tier (e.g., tier 1) and as they successfully complete campaigns 348 their tier level advances (e.g., to tier 2 and so forth). In some such embodiments, the weapons available to users in each item category are a function of their tier level. In this way, as the user advances to more advanced tiers, more advanced items are unlocked in item database 328 and thus made available to the user. As a non-limiting example solely to illustrate this point, in some embodiments, in the assault rifles category, at the tier 1 level, item database 328 and/or virtual weapon database 320 provides a Commando XM-7, a Raptor Mar-21, and a Viper X-72, in the sniper rifles category, at the tier 1 level, item database 328 and/or virtual weapon database 320 provides a Scout M390, a Talon SR-9, and a Ranger 338LM, in the shotguns category, at the tier 1 level, item database 328 and/or virtual weapon database 320 provides a SWAT 1200, a Tactical 871, and a Defender, in the Tesla rifles category, at the tier 1 level, item database 328 and/or virtual weapon database 320 provides an M-25 Terminator, a Tesla Rifle 2, and a Tesla Rifle 3. In some embodiments, the item database 328 and/or virtual weapon database 320 further provides grenades (e.g., frag grenades for damaging groups of enemies crowded together and flushing out enemies hiding behind doors or corners) and knife-packs. In some embodiments, the item database 328, depending on the particular game implementation, further provides magic spells, potions, recipes, bombs, food, cloths, vehicles, space ships, and/or medicinal items. In some embodiments, the characteristics of these items are tiered. For example, in some embodiments, where an item is a weapon, the accuracy of a weapon may be upgraded to a certain point, the point being determined by the user's tier level.

In some embodiments, gaming server module 318 maintains a profile in the user profile database 336 of each user playing the game on a computing device 102. In some embodiments, there are hundreds, thousands, tens of thousands or more users playing instances of the game on corresponding computing devices 102 and a gaming server module 318 stores a profile for each such user in user profile database 336. In some embodiments, the user profile database 336 does not store an actual identity of such users, but rather a simple login and password. In some embodiments, the profiles in the user profile database 336 are limited to the logins and passwords of users. In some embodiments, the profiles in user profile database 336 are limited to the logins, passwords, and tier levels of users. In some embodiments, the profiles in user profile database store more information about each user, such as amounts of game credit, types of weapons owned, characteristics of such weapons, and descriptions of the bases built. In some embodiments, rather than storing a full description of each base in a user profile, the user profile contains a link to base database 340 where the user's bases are stored. In this way, the user's bases may be quickly retrieved using the base database 340 link in the user profile. In some embodiments, the user profile in the user profile database 336 includes a limited amount of information whereas a user profile 48 on a computing device 102 associated with the user contains more information. For example, in some embodiments, the user profile in user profile database 336 includes user login and password and game credit acquired whereas the user profile 48 on the computing device 102 for the same user includes information on weapons and bases associated with the user. It will be appreciated that any possible variation of this is possible, with the profile for the user in user profile database 336 including all or any subset of the data associated with the user and the user profile 48 for the user on the corresponding computing device 102 including all or any subset of the data associated with the user. In some embodiments, there is no user profile 48 stored on computing device 102 and the only profile for the user is stored on gaming server 106 in user profile database 336.

FIG. 2 is an example block diagram illustrating a computing device 102, in accordance with some implementations of the present disclosure. It has one or more processing units (CPU's) 402, peripherals interface 470, memory controller 468, a network or other communications interface 420, a memory 407 (e.g., random access memory), a user interface 406, the user interface 406 including a display 408 and input 410 (e.g., keyboard, keypad, touch screen), an optional accelerometer 417, an optional GPS 419, optional audio circuitry 472, an optional speaker and/or audio jack 460, an optional microphone 462, one or more optional intensity sensors 464 for detecting intensity of contacts on the device 102 (e.g., a touch-sensitive surface such as a touch-sensitive display system 408 of the device 102), optional input/output (I/O) subsystem 466, one or more optional optical sensors 473, one or more communication busses 412 for interconnecting the aforementioned components, and a power system 418 for powering the aforementioned components.

In typical embodiments, the input 410 is a touch-sensitive display, such as a touch-sensitive surface. In some embodiments, the user interface 406 includes one or more soft keyboard embodiments. The soft keyboard embodiments may include standard (QWERTY) and/or non-standard configurations of symbols on the displayed icons.

Device 102 optionally includes, in addition to accelerometer(s) 417, a magnetometer (not shown) and a GPS 419 (or GLONASS or other global navigation system) receiver for obtaining information concerning the location and orientation (e.g., portrait or landscape) of device 102.

It should be appreciated that device 102 is only one example of a multifunction device that may be used, and that device 102 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

Memory 407 optionally includes high-speed random access memory and optionally also includes non-volatile memory, such as one or more magnetic disk storage devices, flash memory devices, or other non-volatile solid-state memory devices. Access to memory 407 by other components of device 102, such as CPU(s) 402 is, optionally, controlled by memory controller 468.

Peripherals interface 470 can be used to couple input and output peripherals of the device to CPU(s) 402 and memory 407. The one or more processors 402 run or execute various software programs and/or sets of instructions stored in memory 407 to perform various functions for device 102 and to process data.

In some embodiments, peripherals interface 470, CPU(s) 402, and memory controller 468 are, optionally, implemented on a single chip. In some other embodiments, they are, optionally, implemented on separate chips.

RF (radio frequency) circuitry 108 of network interface 420 receives and sends RF signals, also called electromagnetic signals. RF circuitry 108 converts electrical signals to/from electromagnetic signals and communicates with communications networks and other communications devices via the electromagnetic signals. RF circuitry 420 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks 106. In some embodiments, circuitry 108 does not include RF circuitry and, in fact, is connected to network 106 through one or more hard wires (e.g., an optical cable, a coaxial cable, or the like).

Examples of networks 106 include, but are not limited to, the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

In some embodiments, audio circuitry 472, speaker 460, and microphone 462 provide an audio interface between a subject (medical practitioner) and device 102. The audio circuitry 472 receives audio data from peripherals interface 470, converts the audio data to an electrical signal, and transmits the electrical signal to speaker 460. Speaker 460 converts the electrical signal to human-audible sound waves. Audio circuitry 472 also receives electrical signals converted by microphone 462 from sound waves. Audio circuitry 472 converts the electrical signal to audio data and transmits the audio data to peripherals interface 470 for processing. Audio data is, optionally, retrieved from and/or transmitted to memory 407 and/or RF circuitry 420 by peripherals interface 470.

In some embodiments, power system 418 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the device 102 optionally also includes one or more optical sensors 473. Optical sensor(s) 473 optionally include charge-coupled device (CCD) or complementary metal-oxide semiconductor (CMOS) phototransistors. Optical sensor(s) 473 receive light from the environment, projected through one or more lens, and converts the light to data representing an image. In conjunction with imaging module 431 (also called a camera module), optical sensor(s) 473 optionally capture still images and/or video. In some embodiments, an optical sensor is located on the back of device 102, opposite display system 408 on the front of the device, so that the touch screen is enabled for use as a viewfinder for still and/or video image acquisition.

As illustrated in FIG. 2, a device 102 preferably comprises an operating system 40 (e.g., iOS, DARWIN, RTXC, LINUX, UNIX, OS X, WINDOWS, or an embedded operating system such as VxWorks), which includes various software components and/or drivers for controlling and managing general system tasks (e.g., memory management, storage device control, power management, etc.) and facilitates communication between various hardware and software components. The device further optionally comprises a file system 42 which may be a component of operating system 40, for managing files stored or accessed by the computing device 102. Further still, the device 102 further comprises a game module 44 for providing a user with a game having the disclosed improved shooter controls. In some embodiments, the device 102 comprises a communications module (or instructions) 46 for connecting the device 102 with other devices (e.g., the gaming server 106 and the devices 102B ... 102N) via one or more network interfaces 420 (wired or wireless), and/or the communication network 104 (FIG. 1).

Further still, in some embodiments, the device 102 comprises a user profile 48 for tracking the aspects of the user. Exemplary aspects include a description of one or more virtual weapons 604-K, and for each such virtual weapon a virtual weapon status 52 and/or virtual weapon characteristics 54 (e.g., firing rate, firepower, reload rate, etc.), game credit 60 across one or more game classes 62 (e.g., a first game credit class through an $N^{th}$ game credit class, where N is a positive integer greater than one), health/tier level 64, and/or a description of one or more items 66 and for each such item 66 the item characteristics;

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 407 optionally stores a subset of the modules and data structures identified above. Furthermore, the memory 407 may store additional modules and data structures not described above.

FIG. 3 is an example block diagram illustrating a gaming server 106 in accordance with some implementations of the present disclosure. The gaming server 106 typically includes one or more processing units CPU(s) 302 (also referred to as processors), one or more network interfaces 304, memory 310, and one or more communication buses 308 for interconnecting these components. The communication buses 308 optionally include circuitry (sometimes called a chipset) that interconnects and controls communications between system components. The memory 310 includes high-speed random access memory, such as DRAM, SRAM, DDR RAM or other random access solid state memory devices and optionally includes non-volatile memory, such as one or more magnetic disk storage devices, optical disk storage devices, flash memory devices, or other non-volatile solid state storage devices. The memory 310 optionally includes one or more storage devices remotely located from CPU(s) 302. The memory 310, or alternatively the non-volatile memory device(s) within the memory 310, comprises a non-transitory computer readable storage medium. In some implementations, the memory 310 or alternatively the non-transitory computer readable storage medium stores the following programs, modules and data structures, or a subset thereof:
- an operating system 312, which includes procedures for handling various basic system services and for performing hardware dependent tasks;
- optionally, a file system 314 which may be a component of operating system 312, for managing files stored or accessed by the gaming server 106;
- a network communication module (or instructions) 316 for connecting the server 106 with other devices (e.g., the computing devices 102) via the one or more network interfaces 304 (wired or wireless), or the communication network 104 (FIG. 1);
- a gaming server module 318 for managing a plurality of instances of a game, each instance corresponding to a different participant (user of a device 102) and for tracking user activities within such games;
- an optional virtual weapon database 320 for storing information regarding a plurality of virtual weapons 604, and information for each such virtual weapon 604 such as the cost 324 of the virtual weapon and/or the characteristics 326 of the virtual weapon;
- an item database 328 to track the items 330 that are supported by the game as well as the costs 332 of such items and the characteristics 334 of such items;
- a user profile database 336 that stores a user profile 338 for each user of the game;
- an optional scene database 340 that stores a description of each scene 606 (e.g., such as the scene illustrated in FIG. 6) that is hosted by the system (e.g. by campaigns 348), including for each such scene 606 information 344 regarding the scene such as opponents 704 (e.g., as illustrated in FIG. 7) that appear in the scene 606; and
- a campaign database 346 for storing the campaigns 348 that may be offered to the gaming server module 318.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 310 optionally stores a subset of the modules and data structures identified above. Furthermore, the memory 310 may store additional modules and data structures not described above.

Although FIGS. 2 and 3 show a "computing device 102" and a "gaming server 106," respectively, FIGS. 2 and 3 are intended more as functional description of the various features which may be present in computer systems than as a structural schematic of the implementations described herein. In practice, and as recognized by those of ordinary skill in the art, items shown separately could be combined and some items could be separated.

Figure 4:
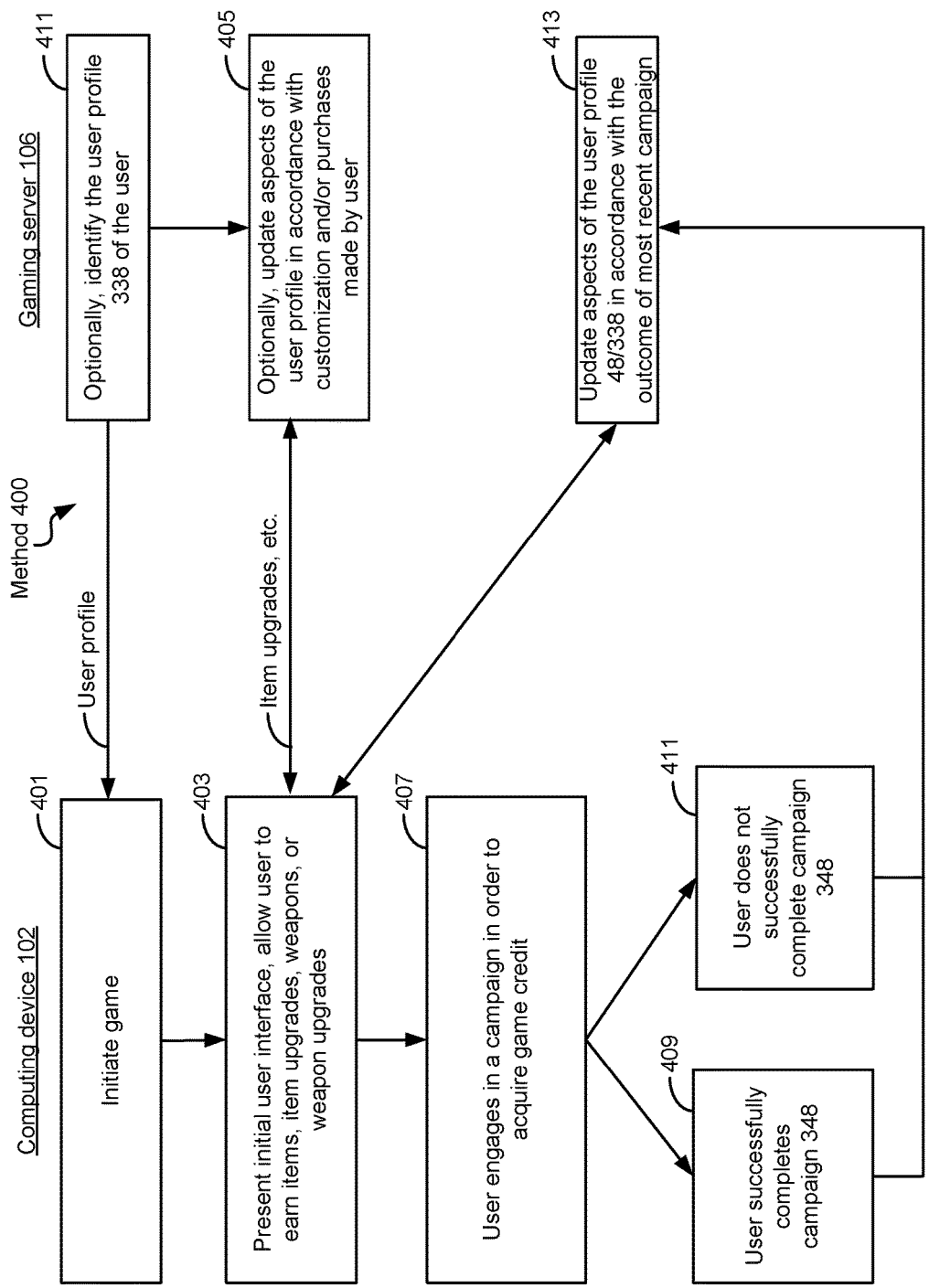
FIG. 4 is an example flow chart illustrating a method for playing a game, in accordance with some implementations of the present disclosure.

FIG. 4 is a flow chart illustrating a method for playing a game, e.g., using a computing device 102 and/or gaming server 106, in accordance with some implementations. In some implementations, a user initiates 401, at the computing device 102, an instruction to start the video game using the computing device 102A. In response, gaming server 106 identifies 411 the user profile 338 associated with the user who just initiated the video game. In some alternative embodiments (not shown), some or all of the components of the user profile is actually obtained from user profile 48 stored locally on the device 102 rather than obtaining a profile of the user from the server. In still other embodiments, some components of the user profile are obtained from user profile 48 of device 102 whereas other components of the user profile are obtained from the user profile 338.

Next an initial user interface FIG. 6 (e.g., a scene 606) is provided to the user to enable the user to earn items, item upgrades, weapons, or weapon upgrades (403). FIG. 6 provides a screen shot of an example initial scene 606 that is presented to the user via computing device 102 when the user has initiated the game. Referring to FIG. 6, a virtual character 602 that is controlled by the user is depicted. In some embodiments, the user is able to customize characteristics of the virtual character 602 and these customizations are stored in the user profile of the user on computing device 102 and/or gaming server 106. In some embodiments the name of the user is displayed. When the user selects the name, the user is able designate a title for the name. Accordingly, in some embodiments, aspects of the user profile are updated in accordance with customization and/or purchases made by the user (405).

Continuing in FIG. 4 and with reference to FIG. 7, in some embodiments, a goal of the game is to accumulate game credit by neutralizing opponents 704 and other defenses in scenes 606 of campaigns 348 (407). Exemplary defenses include, but are not limited to, guards that are adverse to the user and use weapons against the user's virtual character 602. To ward off and neutralize these defenses, in some embodiments, the user selects an item, such as a weapon 604. For instance, referring to FIG. 6, in the initial user interface, the default weapon for the illustrated user could be a Commando XM-7. Scene 606 neutralization is not an easy task, it requires skill on the part of the user as well as good weapons. In some embodiments the user has no choice as to which weapon 604 they may use. In other embodiments, the user can upgrade the weapon 604 and/or characteristics of the weapon in exchange for game credit. In some embodiments, some of the weapon characteristics upgrades (or other forms of item characteristic upgrades) are locked until the user advances to a higher tier. As such, in some embodiments of the present disclosure, some item characteristics upgrades are not available or are locked even though the user may have sufficient game credit. In some embodiments a weapon 604 characteristic is the amount of damage a weapon will inflict when it hits a target. In some embodiments, damage is rated on a numeric scale, such as 1 to 24, with higher numbers representing more significant damage, and the user is able to exchange game credit for a larger number on this scale. Referring to FIG. 2, in some embodiments, the fact that a user possesses a particular virtual weapon is stored as element 604 in their user profile 48, and the weapon characteristics, such as the damage number, is stored as a weapon characteristic 54. In some embodiments, other weapon characteristics 54 of a weapon 604 that are numerically ranked and individually stored as weapon characteristics 54 in accordance with some embodiments of the present disclosure include recoil power, range, accuracy, critical hit chance, reload time, ammunition clip size, and/or critical damage multiplier.

Referring back to FIG. 4, in some embodiments upon successful completion of a campaign 348 (409) or upon unsuccessful completion of a campaign 348 (411), aspects of the user profile 43/338 are updated in accordance with the outcome of the most recent campaign (413).

In some embodiments, the user can select new weapons 604 (e.g., assault rifles, sniper rifles, shotguns, tesla rifles, "equipment" such as knives, etc.). Items purchased by the user and item upgrades made by the user are stored in the user's profile 48/338. Further, the user's profile 48/338 is updated to reflect the usage of game credit for these items and/or item upgrades. In one example, the item is armor, the item characteristic is armor strength on a numerical scale, and the item upgrade is an improvement in the armor strength on the numeric scale. The user selects a campaign 348 in order to acquire game credit 406. In a campaign, the user manipulates the virtual character 602 posed against a plurality of opponents 704 in a scene 606 in an action format in which the virtual character 602 and the plurality of opponents 704 are adverse to each other and use weapons against each other (e.g., fire weapons at each other).

In some such embodiments, the virtual character 602 has an ability to fire a projectile weapon (e.g., fire a gun, light crossbow, sling, heavy crossbow, shortbow, composite shortbow, longbow, composite longbow, hand crossbow, repeating crossbow, etc.) at opponents 704.

In some such embodiments, the virtual character 602 has an ability to swing a weapon (e.g., glaive, guisarme, lance, longspear, ranseur, spiked chain, whip, shuriken, gauntlet, dagger, shortspear, falchion, longsword, bastard sword, greataxe, greatsword, dire flail, dwarven urgrosh, gnome hooked hammer, orc double axe, quarterstaff, two-bladed sword, etc.) at opponents 704 in the scene 606.

In some such embodiments, the virtual character 602 has an ability to throw a weapon (e.g., daggers, clubs, shortspears, spears, darts, javelins, throwing axes, light hammers, tridents, shuriken, net, etc.) at opponents 704 in the scene 606.

Figure 13:
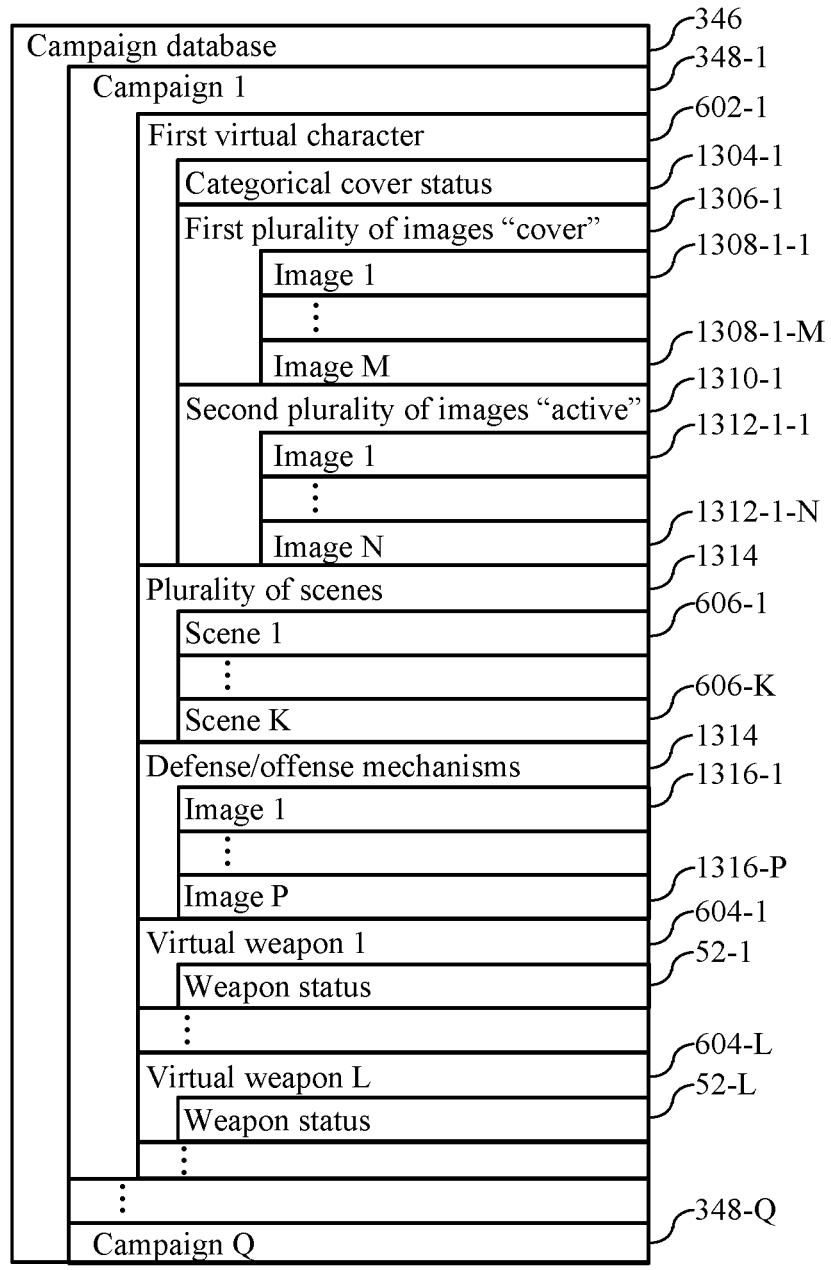
FIG. 13 provides the details of a campaign database in accordance with an embodiment of the present disclosure.

FIG. 5 is an example flow chart illustrating a method (500) in accordance with embodiments of the present disclosure that provides improved shooter controls for taking virtual characters in and out of cover in action video games involving targets with adversity. FIG. 5 makes reference to FIG. 13 which illustrates a campaign database 346 associated with the video game in accordance with an embodiment of the present disclosure.

Referring to block 502, a method is performed at a client device 102 comprising a touch screen display 408, one or more processors 402 and memory 407, in an application (e.g., game module 44 of FIG. 2) running on the client device 102. The application 44 is associated with a user. For instance, the user has provided a login and/or password to the client device 102 for identification purposes and to access the profile of the user.

The application 44 includes a first virtual character 602 that is associated with a categorical cover status 1304 selected from the set {"cover" and "active"}. The cover status "cover" is illustrated by the virtual character 602 in FIGS. 6, 7, and 9.

The cover status "cover" is associated with a first plurality of images 1306 of the first virtual character 602 stored in the client device 102 or accessible to the client device from a remote location (e.g., in the categorical database 346 of gaming server 106). Each image 1308 of the first plurality of images 1306 is of the first virtual character 602 in a cover position. For instance, the portion of the figure illustrating the virtual character 602 in each of FIGS. 6, 7, and 9 constitutes an image 1308 in the first plurality of images 1306.

The cover status "active" is associated with a second plurality of images 1310 of the first virtual character 602 stored in the client device 102 or accessible to the client device from a remote location (e.g., in the categorical database 346 of gaming server 106). Each image 1312 of the second plurality of images 1310 is of the first virtual character 602 in an active position. For instance, the portion of the figure illustrating the virtual character 602 in FIG. 8 constitutes an image 1312 in the second plurality of images 1310.

Figure 5A:
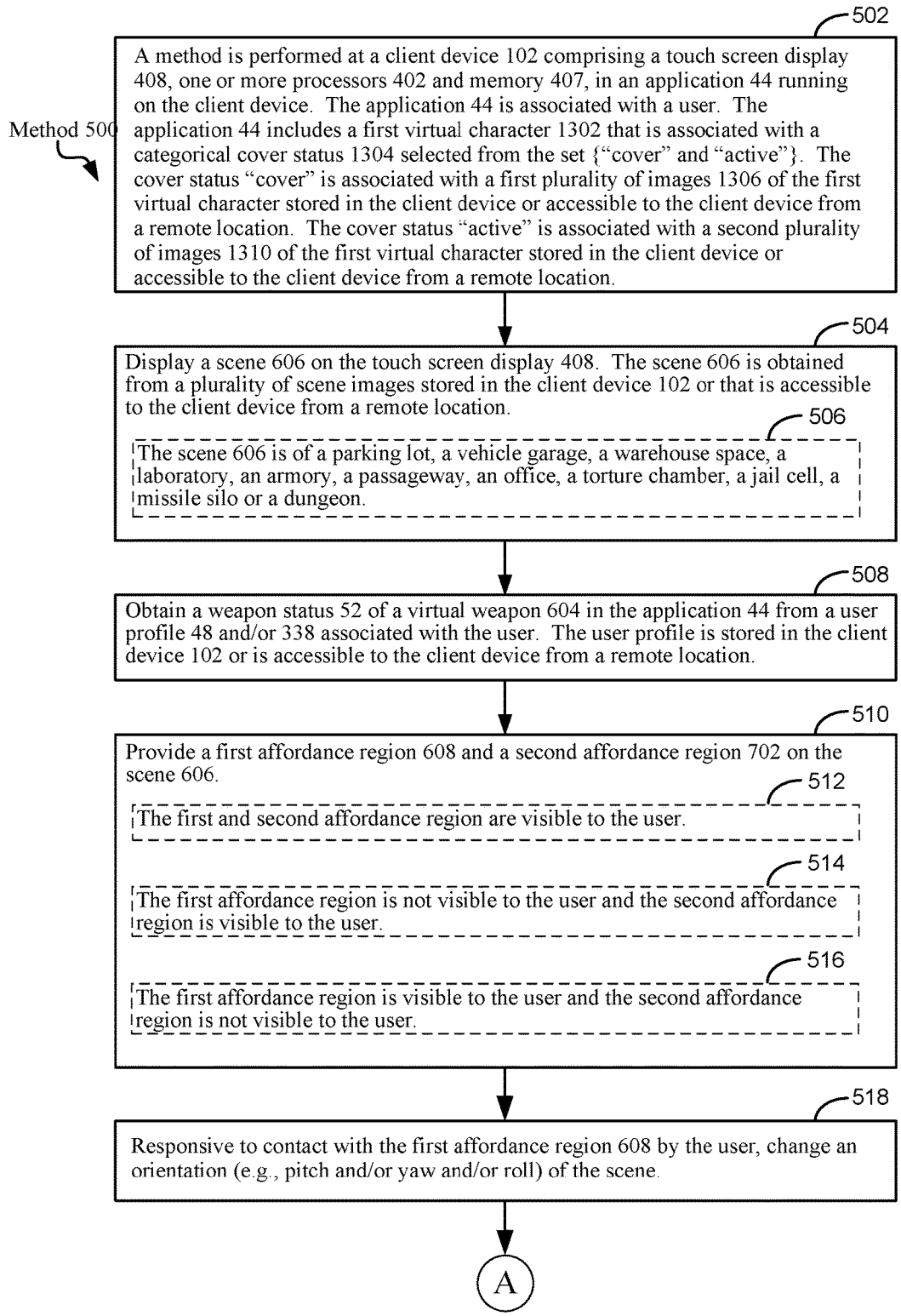
FIGS. 5A, 5B and 5C collectively provide a flowchart of processes and features of a system that provides improved shooter controls for taking virtual characters in and out of cover in action video games involving targets with adversity, in accordance with various embodiments of the present disclosure. In these figures, elements in dashed boxes are optional.

Referring to block 504 of FIG. 5A, a scene 606 is displayed on the touch screen display 408 of the user device 102. The scene 606 is obtained from a plurality of scene images 1314 stored in the client device 102 or that is accessible to the client device from a remote location. For instance, in some embodiments the scenes 606 are stored in campaign database 346 of the gaming server 106. In still other embodiments, the scenes 606 are stored in scene database 340 of the gaming server 106. Each of FIGS. 6 through 9 illustrates a different scene 602 in a campaign 346 of the game module 44. Referring to block 506 of FIG. 5, non-limiting examples of scenes 606 include parking lots, vehicle garages, warehouse spaces, vaults, factories, a laboratories, armories, passageways, offices, torture chambers, jail cells, missile silos and dungeons. In FIGS. 6 through 9, the scene 606 is that of a passageway between buildings.

Referring to block 508 of FIG. 5A, the method continues by obtaining a weapon status 52 of a virtual weapon 604 in the gaming application (e.g., game module 44) from a user profile 48 and/or 338 associated with the user. The user profile is stored in the client device (as user profile 48) and/or is accessible to the client device 102 from a remote location (e.g., from the gaming server 106 as user profile 338). In some embodiments, the user profile refers to the campaign database 346, such as the campaign database illustrated in FIG. 13 to obtain the weapon status 52 of a virtual weapon 604. In some embodiments, the user profile refers to the virtual weapon database 320 on the gaming server 102 to obtain the weapon status 52 of a virtual weapon 604.

Referring to block 510 of FIG. 5A, the method continues with the provision of a first affordance region 608 and a second affordance region 702 on the scene 606. In some embodiments, the first and second affordance regions are visible to the user (512). That is, there is some demarking on the display to denote the boundaries of the affordances. In some embodiments, the first affordance region 608 is not visible to the user and the second affordance region is visible to the user (514). Such an embodiment is illustrated in FIG. 7. That is, in FIG. 7, the first affordance region 608 is not visible to the user, in the sense that the user does not see any markings of the boundary of the first affordance and the second affordance region 702 is visible to user in that the user can see the boundary of the second affordance 702. For completeness, in some embodiments, the first affordance region 608 is visible to the user and the second affordance region 702 is not visible to the user.

Referring to block 518 of FIG. 5A, the first affordance is used to change the orientation of the scene 606. Responsive to contact with the first affordance region by the user, a change in orientation (e.g., pitch and/or yaw and/or roll) of the scene occurs. This is illustrated in FIG. 6, for example, where the user is instructed to drag their thumb across the screen to aim their virtual weapon 602. A picture of a thumb over the first affordance and a direction the thumb should be dragged is provided since the first affordance 608 is not visible to the user.

Figure 5B:
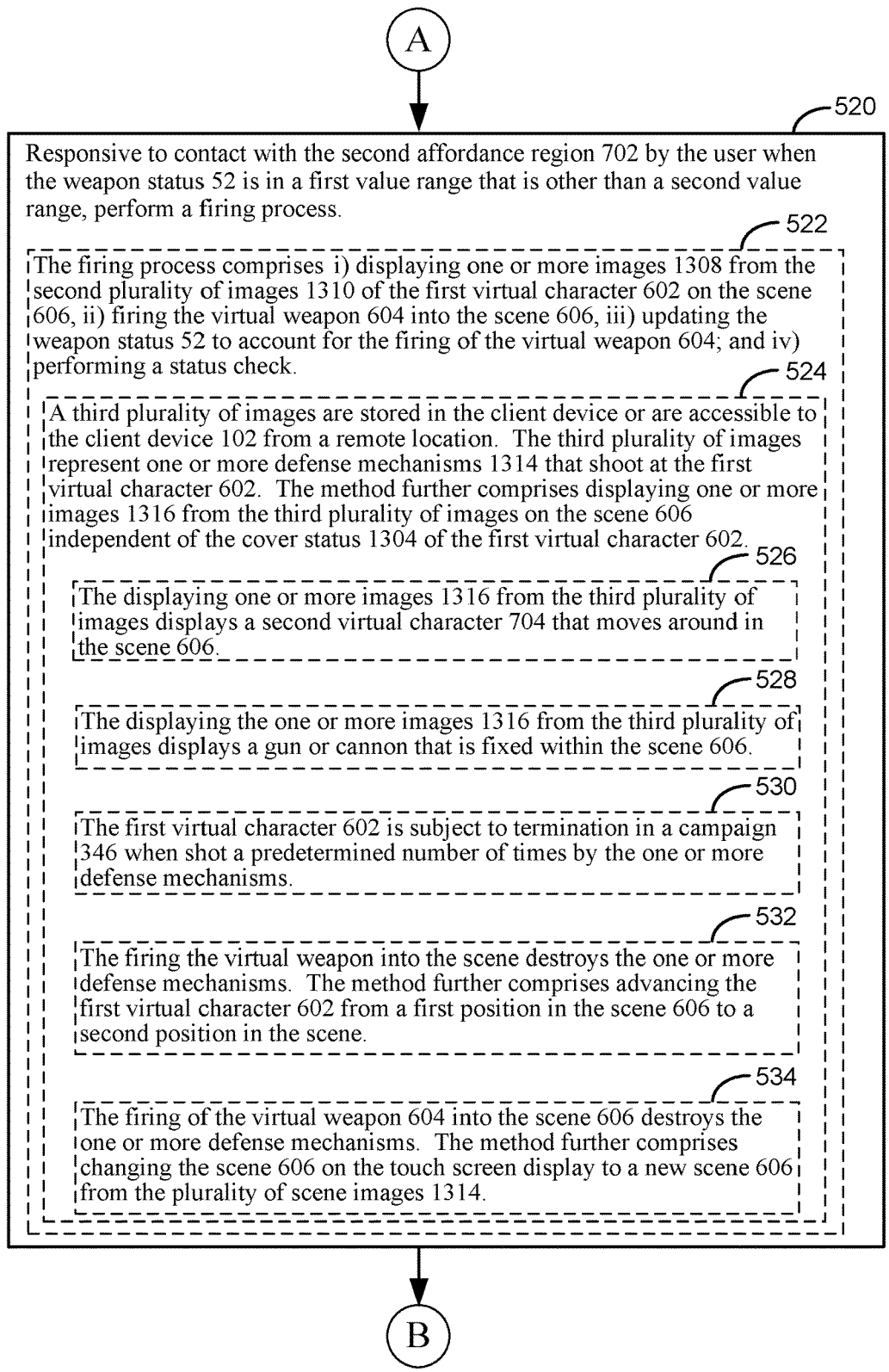

Referring to block 520 of FIG. 5B, responsive to contact with the second affordance region 702 by the user when the virtual weapon status 52 is in a first value range that is other than a second value range, a firing process is performed. For instance, consider the case where the weapon 604 is a gun. The first value range may represent the gun fully or partially loaded while the second value range may represent the gun without bullets. In another case, the weapon is a laser and the first value range indicates that the laser is sufficient charged for use as a weapon whereas the second value range indicates that the laser is in need of recharging.

Referring to block 522 of FIG. 5B, in some embodiments the firing process comprises i) displaying one or more images 1308 from the second plurality of images 1310 of the first virtual character 602 on the scene 606, ii) firing the virtual weapon 604 into the scene 606, iii) updating the weapon status 52 to account for the firing of the virtual weapon; and iv) performing a status check. The second plurality of images 1310 of the first virtual character 602 are images of the character 602 in an active position. In some embodiments there is only one image 1312 of the virtual character 602 in the active state. In some embodiments there are several images of the virtual character 602 in the active states and these images are successively shown to convey movement by the virtual character 602 during the firing process.

Referring to block 524 of FIG. 5B, in typical embodiments a third plurality of images are stored in the client device 102 or are accessible to the client device from a remote location. For instance, in some embodiments the third plurality of images are stored in the campaign database 346 illustrated in FIG. 13 as images 1316 under defense/offense mechanisms 1314. As such, the third plurality of images represents one or more defense (or offense) mechanisms 1314 that shoot at the first virtual character 602. The method further comprises displaying one or more images 1316 from the third plurality of images on the scene 606. In typical embodiments, the action of the defense mechanisms 1314 is independent of the cover status of the first virtual character 602. FIG. 7 illustrates. In FIG. 7, two opponents 704 are attaching the virtual character 604 regardless of the cover status (active or cover) of the virtual character 602. As such, referring to block 526 of FIG. 5B, FIG. 7 illustrates an embodiment of the present disclosure in which the displaying of one or more images 1316 from the third plurality of images displays a second virtual character 704 that moves around in the scene 606. FIGS. 8 and 9 provide further illustrations of such an embodiment of the present disclosure.

Referring to block 528 of FIG. 5B, in some embodiments, the displaying the one or more images 1316 from the third plurality of images displays a gun or cannon that is fixed within the scene 606. Although this is not illustrated in FIGS. 6 through 9, it will be appreciated that in some embodiments, in addition to or instead of opponents 704, there are fixed weapons that shoot at the virtual character 602.

Referring to block 530 of FIG. 5B, in some embodiments the first virtual character 602 is subject to termination in a campaign 346 when shot a predetermined number of times by the one or more defense mechanisms.

Referring to block 532 of FIG. 5B, in some embodiments the firing the virtual weapon 604 into the scene 606 destroys the one or more defense mechanisms. In such embodiments, the method further comprises advancing the first virtual character 602 from a first position in the scene to a second position in the scene. For instance, to illustrate, and referring to FIG. 7, after the first virtual character 602 shoots opponents 704-1 and 704-2, the virtual character is advanced from position 740A to position 740B in the scene 606.

Referring to block 534 of FIG. 5B, in some embodiments, the firing of the virtual weapon 604 into the scene 606 destroys the one or more defense mechanisms. And, in some such embodiments, the method further comprises changing the scene 606 on the touch screen display to a new scene 606 from the plurality of scene images 1314. For instance, to illustrate, and referring to FIG. 7, after the first virtual character 602 shoots opponents 704-1 and 704-2, the virtual character is advance from position 740A of FIG. 7 to a new position in a new scene 606.

Figure 5C:
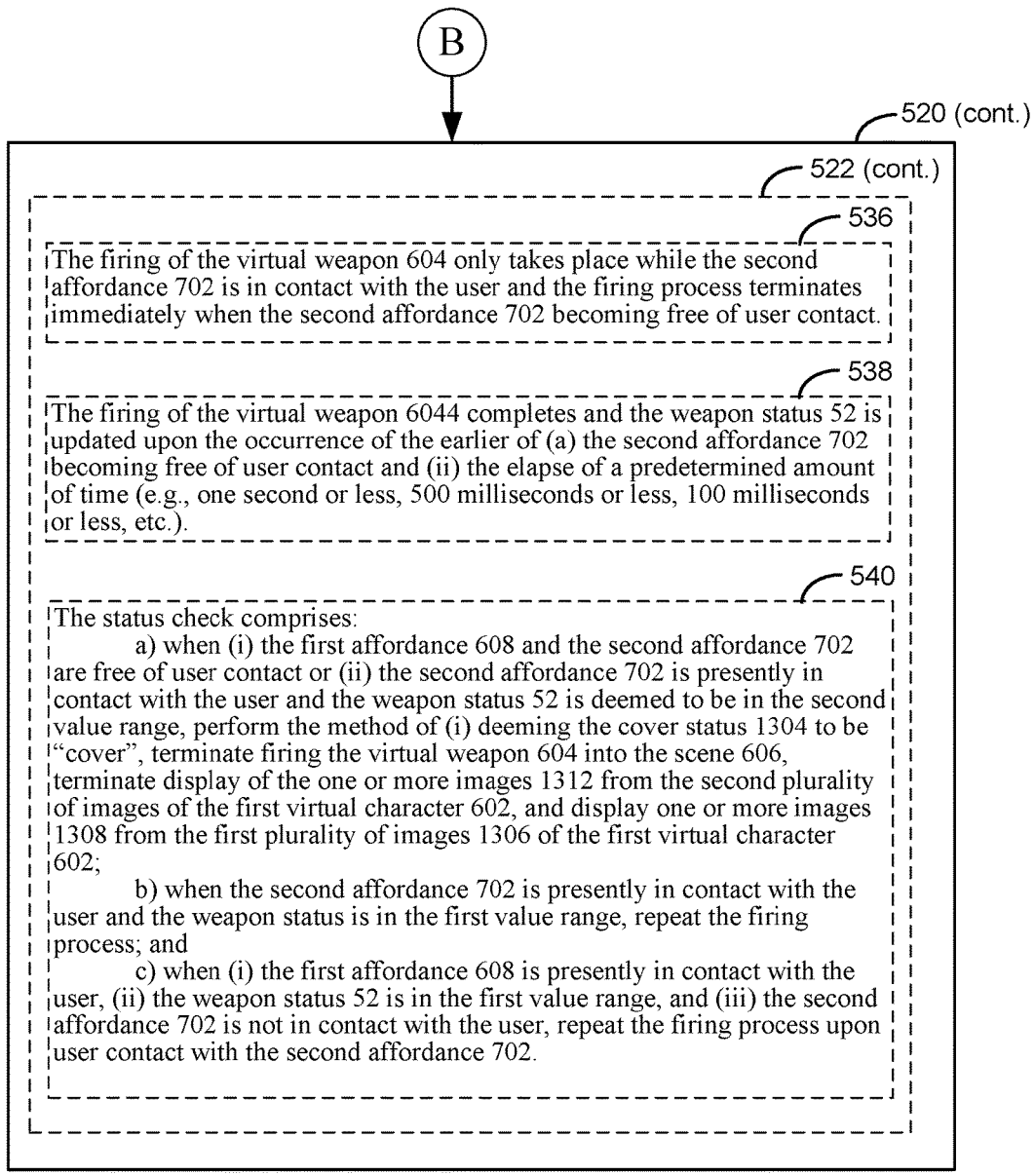

Referring to block 536 of FIG. 5C, in some embodiments, the firing the virtual weapon 604 in the firing process only takes place while the second affordance 702 is in contact with the user and the firing process terminates immediately when the second affordance 702 becomes free of user contact.

Referring to block 538 of FIG. 5C, in some embodiments, the firing the virtual weapon 604 completes and the weapon status 52 is updated upon the occurrence of the earlier of (a) the second affordance 702 becoming free of user contact and (ii) the elapse of a predetermined amount of time (e.g., one second or less, 500 milliseconds or less, 100 milliseconds or less, etc.). Such embodiments are useful when the virtual weapon 604 has a predetermined amount of firing power that can be measured in time. An example of such an embodiment is a machine gun with a set firing rate and a predetermined firing clip size. Such embodiments are not useful when the virtual weapon 604 has a predetermined amount of firing power that is measured in a number of shots fired, and each shot is fired on a non-automatic basis.

Block 540 of FIG. 5C refers to a status check that is part of the firing process of block 522 of FIG. 5B. In some embodiments, this status check is performed on a continual basis throughout the firing process 522. In some embodiments, this status check is performed on a recurring basis (e.g., every millisecond, every 10 milliseconds, every 500 milliseconds, and so forth). In some embodiments, the status check comprises evaluating the state of the first affordance region 608, the second affordance region 702, and the weapon 604. The status check further comprises evaluating the number of defense/offense mechanisms (targets) 1314 remaining, and the cover status of the virtual character 602. In some embodiments, the status check is embodied in the truth table illustrated in FIG. 12. Referring to the status check of block 540 of FIG. 5C, when (i) the first affordance region 608 and the second affordance region 702 are free of user contact or (ii) the second affordance 702 is presently in contact with the user and the weapon status 42 is deemed to be in the second value range (indicating that the weapon needs to be reloaded, a method is performed. In this method, the cover status 1304 of the virtual character 602 is deemed to be "cover", firing of the virtual weapon 604 into the scene 606 is terminated, display of the one or more images 1312 from the second plurality of images 1310 of the first virtual character 602 are terminated, and one or more images 1308 from the first plurality of images 1306 of the first virtual character 602 are displayed. Thus, for instance, the virtual character 602 stops firing a weapon 604 and ducks into cover (e.g., a transition from FIG. 8 to FIG. 9 happens). Or, when the second affordance 702 is presently in contact with the user and the weapon status 52 is in the first value range (indicating that the weapon is loaded or partially loaded) the firing process is repeated. For instance, the process illustrated in FIG. 8 is either continued for a period of time or repeated. Or, when (i) the first affordance 608 is presently in contact with the user, (ii) the weapon status 52 is in the first value range (indicating that the weapon is loaded or partially loaded), and (iii) the second affordance 702 is not in contact with the user, the firing process is repeated upon user contact with the second affordance region 702. That is, cover status 1304 is not changed (the virtual character remains either active or in cover) but the weapon is not fired until the user contacts the second affordance region 702.

In some embodiments, when a user neutralizes the opponents (defense/offense mechanisms 1314) in a scene 606 or all the opponents in a campaign within a predefined time period (e.g., the campaign 346 is successfully completed), the user is awarded a first amount of game credit. In some embodiments, when a user fails to neutralize the opponents (defense/offense mechanisms 1314) in a scene 606 or all the opponents in a campaign within a predefined time period (e.g., the campaign 346 is not successfully completed), the user is awarded no game credit. In some embodiments, no time constraint is imposed on the user and the user can take as long as they want to complete a campaign 346.

Throughout this disclosure the terms profile 48 and profile 338 have been used interchangeably. While a profile 48 is found on a computing device 102 associated with a particular user and a profile 338 is found in a user profile database 336 on a gaming server 106, the present disclosure encompasses all possible variants of such a schema, including embodiments in which profile 48 does not exist or profile 338 does not exist and including embodiments in which some user information is found in profile 48 and some user information is found in profile 338. It is for this reason that the terms profile 48 and profile 338 have been used interchangeably in the present disclosure. Likewise, the terms "player" and "user" have been used interchangeably throughout the present disclosure.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first mark could be termed a second mark, and, similarly, a second mark could be termed a first mark, without changing the meaning of the description, so long as all occurrences of the "first mark" are renamed consistently and all occurrences of the "second mark" are renamed consistently. The first mark, and the second mark are both marks, but they are not the same mark.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising:
at a client device comprising a touch screen display, one or more processors and memory:
in an application running on the client device, wherein the application includes
a first virtual character that is associated with a categorical cover status selected from the set {"cover" and "active"},
a virtual weapon that is associated with a categorical cover status selected from the set {"first value range" and "second value range"},
a first affordance region configured to adjust a camera view in the application responsive to contact with the first affordance region by the user, and
a second affordance region that is different than the first affordance region, the second affordance region configured to perform a firing process responsive to contact with the second affordance region by the user, the firing process comprising consisting of:
i) in accordance with a determination that the second affordance region is free of user contact and the weapon status is deemed to be in the second value range, deeming the cover status to be "cover" and deeming the weapon status to be "first value range",
ii) in accordance with a determination that the second affordance region is free of user contact and the weapon status is deemed to be in the first value range, deeming the cover status to be "cover",
iii) in accordance with a determination that the second affordance is presently in contact with the user and the weapon status is in the first value range, deeming the cover status to be "active" and firing the virtual weapon, and
(iv) in accordance with a determination that the second affordance is in contact with the user and the weapon status is in the second value range, deeming the cover status to be "cover" and deeming the weapon status to be "first value range".

2. The method of claim 1, wherein
the first and second affordance region are visible to the user.

3. The method of claim 1, wherein
the first affordance region is not visible to the user and the second affordance region is visible to the user.

4. The method of claim 1, wherein
the first affordance region is visible to the user and the second affordance region is not visible to the user.

5. The method of claim 1, further comprising
displaying a scene on the touch screen display, wherein the scene is obtained from a plurality of scene images stored in the client device or that is accessible to the client device from a remote location.

6. The method of claim 1, wherein a first plurality of images are stored in the client device or are accessible to the client device from a remote location, wherein the first plurality of images represent one or more defense mechanisms that shoot at the first virtual character, the method further comprising:
displaying one or more images from the first plurality of images on the application independent of the cover status of the first virtual character.

7. The method of claim 6, wherein
the displaying one or more images from the first plurality of images displays a second virtual character that moves around in the application.

8. The method of claim 6, wherein a
the displaying one or more images from the first plurality of images displays a gun or cannon that is fixed within the scene.

9. The method of claim 6, wherein the first virtual character is subject to termination in a campaign when shot a predetermined number of times by the one or more defense mechanisms.

10. The method of claim 6, wherein, when the firing the virtual weapon into the scene destroys the one or more defense mechanisms, and the method further comprises advancing the first virtual character from a first position in the scene to a second position in the scene.

11. The method of claim 6, wherein, when the firing the virtual weapon into the scene destroys the one or more defense mechanisms, the method further comprises changing the scene on the touch screen display to a new scene from the plurality of scene images.

12. The method of claim 1, wherein the firing the virtual weapon only takes place while the second affordance is in contact with the user and the firing process terminates immediately when the second affordance becomes free of user contact.

13. The method of claim 1, wherein the firing the virtual weapon completes and the weapon status is updated upon the occurrence of the earlier of (a) the second affordance becomes free of user contact and (b) the elapse of a predetermined amount of time.

14. The method of claim 13, wherein the predetermined amount of time is one second or less.

15. The method of claim 13, wherein the predetermined amount of time is 500 milliseconds or less.

16. The method of claim 13, wherein the predetermined amount of time is 100 milliseconds or less.

17. A non-transitory computer readable storage medium stored on a computing device, the computing device comprising a touch screen display, one or more processors and memory storing one or more programs for execution by the one or more processors, wherein the one or more programs singularly or collectively comprise instructions for running in an application running on the client device, wherein the application includes
a first virtual character that is associated with a categorical cover status selected from the set {"cover" and "active"},
a virtual weapon that is associated with a categorical cover status selected from the set {"first value range" and "second value range"},
a first affordance region configured to adjust a camera view in the application responsive to contact with the first affordance region by the user, and
a second affordance region that is different than the first affordance region, the second affordance region configured to perform a firing process responsive to contact with the second affordance region by the user the firing process consisting of:
i) in accordance with a determination that the second affordance region is free of user contact and the weapon status is deemed to be in the second value range, deeming the cover status to be "cover" and deeming the weapon status to be "first value range",
ii) in accordance with a determination that the second affordance region is free of user contact and the weapon status is deemed to be in the first value range, deeming the cover status to be "cover",
iii) in accordance with a determination that the second affordance is presently in contact with the user and the weapon status is in the first value range, deeming the cover status to be "active" and firing the virtual weapon, and (iv) in accordance with a determination that the second affordance is in contact with the user and the weapon status is in the second value range, deeming the cover status to be "cover" and deeming the weapon status to be "first value range".

18. A computing system comprising a touch screen display, one or more processors, and memory, the memory storing one or more programs for execution by the one or more processors, the one or more programs singularly or collectively comprising instructions for running an application on the computing system, wherein the application includes
- a first virtual character that is associated with a categorical cover status selected from the set {"cover" and "active"},
- a virtual weapon that is associated with a categorical cover status selected from the set {"first value range" and "second value range"},
- a first affordance region configured to adjust a camera view in the application responsive to contact with the first affordance region by the user, and
- a second affordance region that is different than the first affordance region, the second affordance region configured to perform a firing process responsive to contact with the second affordance region by the user the firing process consisting of:
  - i) in accordance with a determination that the second affordance region is free of user contact and the weapon status is deemed to be in the second value range, deeming the cover status to be "cover" and deeming the weapon status to be "first value range", terminating firing the virtual weapon into the scene,
  - ii) in accordance with a determination that the second affordance region is free of user contact and the weapon status is deemed to be in the first value range, deeming the cover status to be "cover",
  - iii) in accordance with a determination that the second affordance is presently in contact with the user and the weapon status is in the first value range, deeming the cover status to be "active" and firing the virtual weapon, and (iv) in accordance with a determination that the second affordance is in contact with the user and the weapon status is in the second value range, deeming the cover status to be "cover" and deeming the weapon status to be "first value range".

19. A method of serving an application at a server comprising one or more processors, and memory for storing one or more programs to be executed by the one or more processors, the one or more programs singularly or collectively encoding the application, wherein
wherein the application includes
- a first virtual character that is associated with a categorical cover status selected from the set {"cover" and "active"},
- a virtual weapon that is associated with a categorical cover status selected from the set {"first value range" and "second value range"},
- a first affordance region configured to adjust a camera view in the application responsive to contact with the first affordance region by the user, and
- a second affordance region that is different than the first affordance region, the second affordance region configured to perform a firing process responsive to contact with the second affordance region by the user the firing process comprising consisting of:
  - i) in accordance with a determination that the second affordance region is free of user contact and the weapon status is deemed to be in the second value range, deeming the cover status to be "cover" and deeming the weapon status to be "first value range",
  - ii) in accordance with a determination that the second affordance region is free of user contact and the weapon status is deemed to be in the first value range, deeming the cover status to be "cover",
  - iii) in accordance with a determination that the second affordance is presently in contact with the user and the weapon status is in the first value range, deeming the cover status to be "active" and firing the virtual weapon, and (iv) in accordance with a determination that the second affordance is in contact with the user and the weapon status is in the second value range, deeming the cover status to be "cover" and deeming the weapon status to be "first value range.

* * * * *